(12) United States Patent
Yamada et al.

(10) Patent No.: US 9,632,229 B2
(45) Date of Patent: Apr. 25, 2017

(54) OPTICAL FILM, BARRIER FILM, LIGHT CONVERSION MEMBER, BACKLIGHT UNIT, AND LIQUID CRYSTAL DISPLAY DEVICE

(71) Applicant: FUJIFILM Corporation, Tokyo (JP)

(72) Inventors: Naoyoshi Yamada, Kanagawa (JP); Tatsuya Oba, Kanagawa (JP); Yukito Saitoh, Kanagawa (JP); Katsufumi Ohmuro, Kanagawa (JP); Akiko Watano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/041,673

(22) Filed: Feb. 11, 2016

(65) Prior Publication Data

US 2016/0161657 A1 Jun. 9, 2016

Related U.S. Application Data

(63) Continuation of application No. PCT/JP2014/070591, filed on Aug. 5, 2014.

(30) Foreign Application Priority Data

Aug. 12, 2013 (JP) .................................. 2013-167923
Jul. 31, 2014 (JP) .................................. 2014-155734

(51) Int. Cl.
*G02F 1/1335* (2006.01)
*F21V 8/00* (2006.01)

(52) U.S. Cl.
CPC ........... *G02B 6/005* (2013.01); *G02B 6/0023* (2013.01); *G02F 1/1336* (2013.01);
(Continued)

(58) Field of Classification Search
CPC .................. G02B 6/005; G02B 6/0023; G02F 2001/133614; G02F 1/1336
See application file for complete search history.

(56) References Cited

U.S. PATENT DOCUMENTS 9,110,203 B2 8/2015 Seo et al.
2008/0084517 A1* 4/2008 Itou ................... G02F 1/133555
349/62

(Continued)

FOREIGN PATENT DOCUMENTS

JP 2005-096108 A 4/2005
JP 2012-169271 A 9/2012

OTHER PUBLICATIONS

International Search Report issued in connection with International Patent Application No. PCT/JP2014/070591 on Nov. 4, 2014.
(Continued)

*Primary Examiner* — Paul Lee
(74) *Attorney, Agent, or Firm* — Jean C. Edwards, Esq.; Edwards Neils LLC

(57) ABSTRACT

A liquid crystal display device having high transmittance and a high color reproduction region, which includes a backlight unit including a light conversion member; and a liquid crystal cell and in which the light conversion member includes a light conversion layer containing a fluorescent material and an optical film arranged on both surfaces of the light conversion layer, the optical film includes an optical thin film forming an air interface, and a layer directly adjacent to the optical thin film, the liquid crystal display device satisfies n(535)<nu(535), n(535)×d is in a specific range, transmittance of a laminated body of the optical thin film and the layer directly adjacent to the optical thin film is in a specific range, and the backlight unit emits blue light, green light, and red light.

24 Claims, 4 Drawing Sheets

(52) U.S. Cl.
CPC .. *G02F 1/133617* (2013.01); *G02F 1/133615* (2013.01); *G02F 2001/133614* (2013.01)

(56) References Cited

U.S. PATENT DOCUMENTS

| | | | |
|---|---|---|---|
| 2009/0231847 A1* | 9/2009 | Pan | G02B 6/0023 362/240 |
| 2010/0102251 A1* | 4/2010 | Ferrini | H05B 33/22 250/484.4 |
| 2011/0141769 A1* | 6/2011 | Lee | G02B 6/0023 362/629 |
| 2012/0113672 A1 | 5/2012 | Dubrow et al. | |
| 2012/0206935 A1 | 8/2012 | Seo et al. | |

OTHER PUBLICATIONS

Written Opinion issued in connection with International Patent Application No. PCT/JP2014/070591 on Nov. 4, 2014.
Jian Chen et al; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.
International Preliminary Report on Patentability issued by WIPO on Feb. 25, 2016, in connection with International Patent Application No. PCT/JP2014/070591.

\* cited by examiner

OPTICAL FILM, BARRIER FILM, LIGHT CONVERSION MEMBER, BACKLIGHT UNIT, AND LIQUID CRYSTAL DISPLAY DEVICE

CROSS-REFERENCE TO RELATED APPLICATIONS

This application is a Continuation of PCT International Application No. PCT/JP2014/070591, filed on Aug. 5, 2014, which was published under PCT Article 21(2) in Japanese, and claims priority under 35 U.S.C. Section 119(a) to Japanese Patent Application No. 2013-167923 filed on Aug. 12, 2013 and Japanese Patent Application No. 2014-155734 filed on Jul. 31, 2014. The above applications are hereby expressly incorporated by reference, in their entirety, into the present application.

BACKGROUND OF THE INVENTION

1. Field of the Invention

The present invention relates to an optical film, a barrier film, a light conversion member, a backlight unit, and a liquid crystal display device. More specifically, the present invention relates to an optical film, a barrier film using the optical film, a light conversion member using the optical film or the barrier film, a backlight unit using the light conversion member, and a liquid crystal display device using the backlight unit.

2. Description of the Related Art

A flat panel display such as a liquid crystal display device (hereinafter, also referred to as LCD) has been variously used annually as a space saving image display device having low power consumption. The liquid crystal display device, for example, is configured by disposing backlight (hereinafter, also referred to as BL), a backlight side polarizing plate, a liquid crystal cell, a visible side polarizing plate, and the like in this order.

In the recent flat panel display market, power saving, high definition, and improvement in color reproducibility have progressed as enhancement in LCD performance, and in particular, the progress of the enhancement in LCD performance is remarkable in a small-size display of a tablet PC, a smart phone, or the like, and a next-generation hi-vision (4K2K, an EBU ratio of greater than or equal to 100%) of the current TV standard (FHD, a national television system committee (NTSC)) ratio of 72%≈ an European broadcasting union (EBU) ratio of 100%) has been developed. However, in order to supply the next-generation hi-vision to the market, a cost reduction according to a reduction in the number of members by further performing functional integration of the members is essential.

A method of increasing light utilization efficiency of the backlight which is necessary for the power saving has been examined. For example, in JP2012-169271A, a method is disclosed in which a quantum dot (hereinafter, also referred to as QD and a quantum dot) emitting red light and green light is used between a blue LED and a light guide plate as a fluorescent body, and white light is embodied by emitting RGB bright line light (blue light, green light, and red light having a small full width at half maximum), and thus high brightness and improvement in color reproducibility are realized.

In SID'12 DIGEST p. 895, a method of combining a light conversion sheet (QDEF) using a quantum dot for enhancing color reproducibility of the LCD is proposed.

In addition, in an optical film member used in the liquid crystal display device, study of increasing transmittance in order to increase light utilization efficiency has been examined. For example, in JP2005-96108A, a method is proposed in which high total light transmittance and high barrier properties are compatible with each other by adjusting a film thickness of each layer of a barrier film which is used in an optical member of FPD or the like and includes a substrate, a first inorganic layer, an organic film, and a second inorganic film in this order.

Furthermore, an example is known in which the barrier film is laminated on the light conversion sheet using the quantum dot even though this example does not directly indicate enhancement in the light transmittance (refer to US2012/0113672A).

SUMMARY OF THE INVENTION

However, in a fluorescent (PL) application technology disclosed in JP2012-169271A and SID'12 DIGEST p. 895, the white light embodied by emitting the RGB bright line light using the quantum dot (hereinafter, also referred to as QD) realizes high brightness and improvement in the color reproducibility, but further enhancement in the light transmittance has been required.

In addition, in the method for increasing the total light transmittance of the barrier film disclosed in JP2005-96108A, only the average value of the total light transmittance in a visible region of 380 nm to 800 nm increases, and the average value of the total light transmittance of an optical film member obtained in an example of JP2005-96108A is just 90%, and thus further enhancement in the light transmittance has been required.

Thus, enhancement in BL light utilization efficiency and high definition (a decrease in an opening ratio) necessary for power saving, and improvement in color reproducibility (a decrease in transmittance of a color filter (hereinafter, also referred to as CF)) are in a trade-off relationship, and thus enhancement in light utilization efficiency and color reproducibility are required to be compatible with each other.

An object of the present invention is to provide a liquid crystal display device having high light transmittance and a high color reproduction region.

As a result of intensive studies of the present inventors for attain the object described above, it has been found that in a liquid crystal display device using emission of RGB bright line light (a full width at half maximum of less than or equal to 100 nm), an optical thin film of a single layer (formed of one layer) is disposed on an air interface of an optical film arranged on both surfaces of a light conversion layer containing a fluorescent material, and a product of a refractive index and a thickness of the optical thin film is in a certain relationship, and thus a peak of light transmittance is able to correspond to an emission peak wavelength of the RGB bright line light, maximum brightness of the liquid crystal display device using the RGB bright line light is obtained, and high light transmittance and color reproducibility are able to be compatible with each other.

That is, the object described above is attained by the present invention having the following configurations.

[1] A liquid crystal display device including a backlight unit including a light conversion member; and a liquid crystal cell, in which the light conversion member includes a light conversion layer containing a fluorescent material and an optical film arranged on both surfaces of the light conversion layer containing the fluorescent material, the optical film includes an optical thin film forming an air interface, and a layer directly adjacent to the optical thin film, the optical film satisfies the following Expression (1), the optical film satisfies any one of the following Expressions (2-1), (2-2), and (2-3), all transmittances of the optical film at a Y value in an XYZ color system at a wavelength of 430 nm to 470 nm, a wavelength of 515 nm to 555 nm, and a wavelength of 600 nm to 650 nm are greater than transmittance of the optical film at a Y value in an XYZ color system at a wavelength of greater than 470 nm and less than 515 nm and a wavelength of greater than 555 nm and less than 600 nm, and the backlight unit emits blue light which has an emission peak wavelength in a wavelength range of 430 nm to 480 nm and a full width at half maximum of less than or equal to 100 nm, green light which has an emission peak wavelength in a wavelength range of 500 nm to 600 nm and a full width at half maximum of less than or equal to 100 nm, and red light which has an emission peak wavelength in a wavelength range of 600 nm to 650 nm and a full width at half maximum of less than or equal to 100 nm.

$$n(535) < nu(535) \quad \text{Expression (1)}$$

(In Expression (1), n(535) represents a refractive index of the optical thin film at a wavelength of 535 nm, and nu(535) represents a refractive index of the layer directly adjacent to the optical thin film at a wavelength of 535 nm.)

$$1.15 \ \mu m \leq n(535) \times d \leq 1.25 \ \mu m \quad \text{Expression (2-1)}$$

$$1.42 \ \mu m \leq n(535) \times d \leq 1.52 \ \mu m \quad \text{Expression (2-2)}$$

$$1.69 \ \mu m \leq n(535) \times d \leq 1.79 \ \mu m \quad \text{Expression (2-3)}$$

(In Expressions (2-1), (2-2), and (2-3), n(535) represents a refractive index of the optical thin film at a wavelength of 535 nm, and d represents a thickness (unit: μm) of the optical thin film.)

[2] In the liquid crystal display device according to [1], it is preferable that the optical film is an optical film in which at least a first organic film, a substrate, an inorganic film, and a second organic film are laminated in this order, and the optical thin film is the first organic film, and the substrate is the layer directly adjacent to the optical thin film.

[3] In the liquid crystal display device according to [1], it is preferable that the optical film is an optical film in which at least a substrate, an inorganic film, and an organic film are laminated in this order, and the optical thin film is the organic film, and the inorganic film is the layer directly adjacent to the optical thin film.

[4] In the liquid crystal display device according to [2] or [3], it is preferable that the inorganic film is a silicon oxide film or a silicon oxide nitride film.

[5] In the liquid crystal display device according to any one of [1] to [4], it is preferable that the optical thin film contains a Cardo polymer.

[6] In the liquid crystal display device according to any one of [1] to [5], it is preferable that the liquid crystal display device satisfies any one of the following Expressions (2-1A), (2-2A), and (2-3A).

$$1.16 \ \mu m \leq n(535) \times d \leq 1.24 \ \mu m \quad \text{Expression (2-1A)}$$

$$1.46 \ \mu m \leq n(535) \times d \leq 1.51 \ \mu m \quad \text{Expression (2-2A)}$$

$$1.70 \ \mu m \leq n(535) \times d \leq 1.78 \ \mu m \quad \text{Expression (2-3A)}$$

(In Expressions (2-1A), (2-2A), and (2-3A), n(535) represents a refractive index of the optical thin film at a wavelength of 535 nm, and d represents a thickness (unit: μm) of the optical thin film.)

[7] In the liquid crystal display device according to [6], it is preferable that the liquid crystal display device satisfies Expression (2-2A) described above.

[8] In the liquid crystal display device according to any one of [1] to [7], it is preferable that all transmittances of a laminated body of the optical thin film and the layer directly adjacent to the optical thin film at a Y value in an XYZ color system at a wavelength of 430 nm to 470 nm, a wavelength of 515 nm to 555 nm, and a wavelength of 600 nm to 650 nm are greater than or equal to 97%.

[9] In the liquid crystal display device according to any one of [1] to [8], it is preferable that all transmittances of the laminated body of the optical thin film and the layer directly adjacent to the optical thin film at a Y value in an XYZ color system at a wavelength of greater than 470 nm and less than 515 nm and a wavelength of greater than 555 nm and less than 600 nm are less than 97%.

[10] In the liquid crystal display device according to any one of [1] to [9], it is preferable that the backlight unit includes a light guide plate, and the light conversion member is arranged between the light guide plate and the liquid crystal cell.

[11] In the liquid crystal display device according to any one of [1] to [9], it is preferable that the backlight unit includes a light guide plate and a light source, and the light conversion member is arranged between the light guide plate and the light source.

[12] In the liquid crystal display device according to any one of [1] to [11], it is preferable that the optical film is a barrier film, the barrier film is for the light conversion member containing the fluorescent material, and oxygen permeability of the barrier film is less than or equal to 0.5 $cm^3/m^2/day/atm$.

[13] In the liquid crystal display device according to any one of [1] to [12], it is preferable that the fluorescent material is a quantum dot.

[14] An optical film for a light conversion member containing a fluorescent material including an optical thin film forming an air interface; and a layer directly adjacent to the optical thin film, in which the optical film satisfies the following Expression (1), the optical film satisfies any one of the following Expressions (2-1), (2-2), and (2-3), and all transmittances of the optical film at a Y value in an XYZ color system at a wavelength of 430 nm to 470 nm, a wavelength of 515 nm to 555 nm, and a wavelength of 600 nm to 650 nm are greater than transmittance of the optical film at a Y value in an XYZ color system at a wavelength of greater than 470 nm and less than 515 nm and a wavelength of greater than 555 nm and less than 600 nm.

$$n(535) < nu(535) \quad \text{Expression (1)}$$

(In Expression (1), n(535) represents a refractive index of the optical thin film at a wavelength of 535 nm, and nu(535) represents a refractive index of the layer directly adjacent to the optical thin film at a wavelength of 535 nm.)

$$1.15 \ \mu m \leq n(535) \times d \leq 1.25 \ \mu m \quad \text{Expression (2-1)}$$

$$1.42 \ \mu m \leq n(535) \times d \leq 1.52 \ \mu m \quad \text{Expression (2-2)}$$

$$1.69 \ \mu m \leq n(535) \times d \leq 1.79 \ \mu m \quad \text{Expression (2-3)}$$

(In Expressions (2-1), (2-2), and (2-3), n(535) represents a refractive index of the optical thin film at a wavelength of 535 nm, and d represents a thickness (unit: μm) of the optical thin film.)

[15] In the optical film according to [14], it is preferable that the optical film is an optical film in which at least a first organic film, a substrate, an inorganic film, and a second organic film are laminated in this order, and the optical thin film is the first organic film, and the substrate is the layer directly adjacent to the optical thin film.

[16] In the optical film according to [14], it is preferable that the optical film is an optical film in which at least a substrate, an inorganic film, and an organic film are laminated in this order, and the optical thin film is the organic film, and the inorganic film is the layer directly adjacent to the optical thin film.

[17] In the optical film according to [15] or [16], it is preferable that the inorganic film is a silicon oxide film or a silicon oxide nitride film.

[18] In the optical film according to any one of [14] to [17], it is preferable that the optical thin film contains a Cardo polymer.

[19] In the optical film according to any one of [14] to [18], it is preferable that the optical film satisfies any one of the following Expressions (2-1A), (2-2A), and (2-3A).

$$1.16\ \mu m \leq n(535) \times d \leq 1.24\ \mu m \quad \text{Expression (2-1A)}$$

$$1.46\ \mu m \leq n(535) \times d \leq 1.51\ \mu m \quad \text{Expression (2-2A)}$$

$$1.70\ \mu m \leq n(535) \times d \leq 1.78\ \mu m \quad \text{Expression (2-3A)}$$

(In Expressions (2-1A), (2-2A), and (2-3A), n(535) represents a refractive index of the optical thin film at a wavelength of 535 nm, and d represents a thickness (unit: μm) of the optical thin film.)

[20] In the optical film according to [19], it is preferable that the optical film satisfies Expression (2-2A) described above.

[21] In the optical film according to any one of [14] to [20], it is preferable that all transmittances of a laminated body of the optical thin film and the layer directly adjacent to the optical thin film at a Y value in an XYZ color system at a wavelength of 430 nm to 470 nm, a wavelength of 515 nm to 555 nm, and a wavelength of 600 nm to 650 nm are greater than or equal to 97%.

[22] In the optical film according to any one of [14] to [21], it is preferable that all transmittances of the laminated body of the optical thin film and the layer directly adjacent to the optical thin film at a Y value in an XYZ color system at a wavelength of greater than 470 nm and less than 515 nm and a wavelength of greater than 555 nm and less than 600 nm are less than 97%.

[23] In the optical film according to any one of [14] to [22], it is preferable that the fluorescent material is a quantum dot.

[24] A barrier film including the optical film according to any one of [14] to [23], in which the barrier film is for a light conversion member containing a fluorescent material, and oxygen permeability is less than or equal to 0.5 cm$^3$/m$^2$/day/atm.

[25] A light conversion member including a light conversion layer containing a fluorescent material; and the optical film according to any of one [14] to [23] or the barrier film according to [24] which is each independently arranged on both surfaces of the light conversion layer containing the fluorescent material.

[26] A backlight unit including the light conversion member according to [25], in which backlight unit emits blue light which has an emission peak wavelength in a wavelength range of 430 nm to 480 nm and a full width at half maximum of less than or equal to 100 nm, green light which has an emission peak wavelength in a wavelength range of 500 nm to 600 nm and a full width at half maximum of less than or equal to 100 nm, and red light which has an emission peak wavelength in a wavelength range of 600 nm to 650 nm and a full width at half maximum of less than or equal to 100 nm.

[27] In the backlight unit according to [26], it is preferable that the backlight unit further includes a light guide plate, and the light conversion member is arranged on a path of light exiting from the light guide plate.

[28] In the backlight unit according to [26], it is preferable that the backlight unit further includes a light guide plate and a light source, and the light conversion member is arranged between the light guide plate and the light source.

According to the present invention, it is possible to provide a liquid crystal display device having high light transmittance and a high color reproduction region.

DESCRIPTION OF THE PREFERRED EMBODIMENTS

Figure 1:
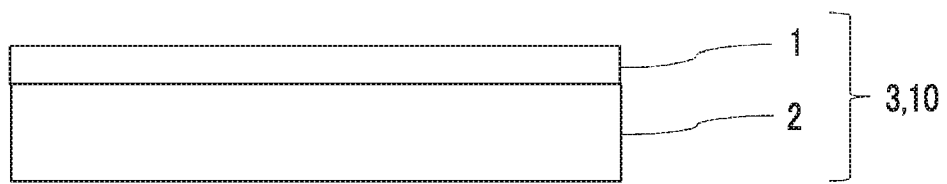
FIG. 1 is a schematic view illustrating a sectional surface of an example of an optical film of the present invention.

Hereinafter, an optical film, a barrier film, a light conversion member, a backlight unit, and a liquid crystal display device of the present invention will be described in detail.

The following description of configuration requirements are based on representative embodiments or specific examples, but the present invention is not limited to the embodiments. Furthermore, herein, "to" indicates a range including the numerical values before and after "to" as the lower limit value and the upper limit value.

Herein, a "full width at half maximum" of a peak indicates the width of a peak at ½ of a peak height.

[Liquid Crystal Display Device]

A liquid crystal display device of the present invention includes a backlight unit including a light conversion member, and a liquid crystal cell, the light conversion member includes a light conversion layer containing a fluorescent material and an optical film arranged on both surfaces of the light conversion layer containing the fluorescent material, the optical film includes an optical thin film forming an air interface, and a layer directly adjacent to the optical thin film, the optical film satisfies the following Expression (1), the optical film satisfies any one of the following Expressions (2-1), (2-2), and (2-3), all transmittances of the optical film at a Y value in an XYZ color system at a wavelength of 430 nm to 470 nm, a wavelength of 515 nm to 555 nm, and a wavelength of 600 nm to 650 nm are greater than transmittance of the optical film at a Y value in an XYZ color system at a wavelength of greater than 470 nm and less than 515 nm and a wavelength of greater than 555 nm and less than 600 nm, and the backlight unit emits blue light which has an emission peak wavelength in a wavelength range of 430 nm to 480 nm and a full width at half maximum of less than or equal to 100 nm, green light which has an emission peak wavelength in a wavelength range of 500 nm to 600 nm and a full width at half maximum of less than or equal to 100 nm, and red light which has an emission peak wavelength in a wavelength range of 600 nm to 650 nm and a full width at half maximum of less than or equal to 100 nm.

$$n(535) < nu(535) \quad \text{Expression (1)}$$

(In Expression (1), n(535) represents a refractive index of the optical thin film at a wavelength of 535 nm, and nu(535) represents a refractive index of the layer directly adjacent to the optical thin film at a wavelength of 535 nm.)

$$1.15\ \mu m \leq n(535) \times d \leq 1.25\ \mu m \quad \text{Expression (2-1)}$$

$$1.42\ \mu m \leq n(535) \times d \leq 1.52\ \mu m \quad \text{Expression (2-2)}$$

$$1.69\ \mu m \leq n(535) \times d \leq 1.79\ \mu m \quad \text{Expression (2-3)}$$

(In Expressions (2-1), (2-2), and (2-3), n(535) represents a refractive index of the optical thin film at a wavelength of 535 nm, and d represents a thickness (unit: μm) of the optical thin film.)

In addition, an optical film of the present invention is for a light conversion member containing a fluorescent material and includes an optical thin film forming an air interface, and a layer directly adjacent to the optical thin film, the optical film satisfies the following Expression (1), the optical film satisfies any one of the following Expressions (2-1), (2-2), and (2-3), and all transmittances of the optical film at a Y value in an XYZ color system at a wavelength of 430 nm to 470 nm, a wavelength of 515 nm to 555 nm, and a wavelength of 600 nm to 650 nm are greater than transmittance of the optical film at a Y value in an XYZ color system at a wavelength of greater than 470 nm and less than 515 nm and a wavelength of greater than 555 nm and less than 600 nm.

$$n(535) < nu(535) \quad \text{Expression (1)}$$

(In Expression (1), n(535) represents a refractive index of the optical thin film at a wavelength of 535 nm, and nu(535) represents a refractive index of the layer directly adjacent to the optical thin film at a wavelength of 535 nm.)

$$1.15\ \mu m \leq n(535) \times d \leq 1.25\ \mu m \quad \text{Expression (2-1)}$$

$$1.42\ \mu m \leq n(535) \times d \leq 1.52\ \mu m \quad \text{Expression (2-2)}$$

$$1.69\ \mu m \leq n(535) \times d \leq 1.79\ \mu m \quad \text{Expression (2-3)}$$

(In Expressions (2-1), (2-2), and (2-3), n(535) represents a refractive index of the optical thin film at a wavelength of 535 nm, and d represents a thickness (unit: μm) of the optical thin film.) According to such a configuration, the liquid crystal display device of the present invention including the optical film of the present invention has high light transmittance and a high color reproduction region. Such effects are obtained by the following reasons, but are not regulated by any theory.

Wavelength dependency of light transmittance of the optical film of the present invention (the laminated body of the optical thin film and the layer directly adjacent to the optical thin film) considerably depends on the uppermost surface, that is, a film thickness and a refractive index of the optical thin film of the air interface. This is because reflection having a considerable difference between a refractive index (1.0) of air and a refractive index (in general, 1.3 times to 1.7 times) of the layer of the optical film directly adjacent to the optical thin film occurs. A method of using light interference is known as a method of suppressing the reflection and of increasing light transmittance, and when the following expression is satisfied, the light transmittance is maximized.

$$nd = (2m-1) * \lambda/4$$

(Here, n represents a refractive index of the optical thin film, d represents a film thickness of an optical film (unit: μm) of the optical film, m represents a natural number which is the order of interference, and λ represents a reflection wavelength. However, a refractive index nu of the layer directly adjacent to the optical thin film is greater than a refractive index n of the optical thin film.)

Light transmittance T at a wavelength λ of the optical film is approximately denoted by the following expression.

$$T = A * \sin^2(2\pi * d/\lambda * (2m-1)) + C$$

(Here, A and C represent integers, and are determined by the configuration of the layer of the optical film directly adjacent to the optical thin film and a lower layer the layer.)

As a result of repeating trial and error by the present inventors, it has been found that in the expression of the transmittance T, a peak of the light transmittance of the optical film is able to be exactly fitted into an emission intensity peak of triple-wavelength backlight by setting m to 5 to 7 (preferably m=6), and thus maximum transmittance is obtained. This method is different from a method using a multilayer film disclosed in JP2005-96108A of the related art, and it is possible to increase light transmittance by disposing the optical thin film of only one layer, and thus this method is preferable. In addition, in the multilayer film of the related art, a thin film of approximately 0.1 μm is necessary, and coating properties deteriorate, and it is difficult to control the film thickness, but in the present invention, a comparatively thick optical thin film having an optical thickness of approximately 1 μm is used, and thus when the optical thin film is manufactured, for example, by coating, coating properties are excellent, the film thickness of the optical thin film is also easily controlled, and a peak at which the light transmittance is maximized is able to be reliably fitted into the emission intensity peak of the backlight.

Hereinafter, a preferred aspect of the liquid crystal display device of the present invention will be described.

<Overall Configuration of Liquid Crystal Display Device>

First, a preferred configuration of the liquid crystal display device of the present invention will be described with reference to FIG. 1 to FIG. 7. However, the liquid crystal display device of the present invention is not narrowly interpreted by the drawings.

Figure 6:
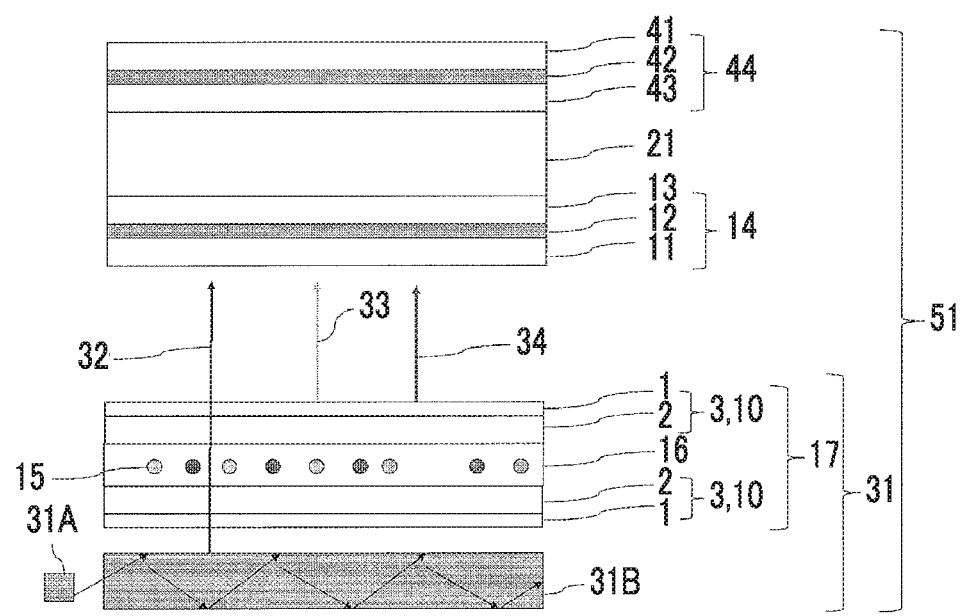
FIG. 6 is a schematic view illustrating a sectional surface of an example of a liquid crystal display device of the present invention.
Figure 7:
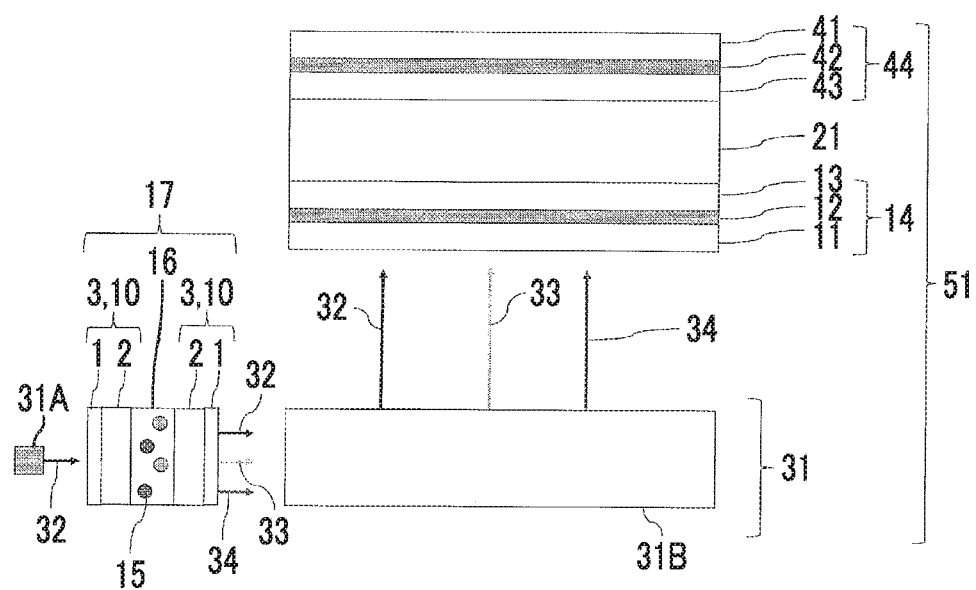
FIG. 7 is a schematic view illustrating a sectional surface of another example of the liquid crystal display device of the present invention.

A liquid crystal display device 51 of the present invention illustrated in FIG. 6 and FIG. 7 includes a backlight unit 31 including a light conversion member 17, and a liquid crystal cell 21, the light conversion member 17 includes a light conversion layer 16 containing a fluorescent material 15, and an optical film 10 arranged on both surfaces of the light conversion layer 16 containing the fluorescent material, the optical film 10 includes an optical thin film 1 forming an air interface, and a layer directly adjacent to the optical thin film; the backlight unit 31 emits blue light 32 which has an emission peak wavelength in a wavelength range of 430 nm to 480 nm and a full width at half maximum of less than or equal to 100 nm, green light 33 which has an emission peak wavelength in a wavelength range of 500 nm to 600 nm and a full width at half maximum of less than or equal to 100 nm, and red light 34 which has an emission peak wavelength in a wavelength range of 600 nm to 650 nm and a full width at half maximum of less than or equal to 100 nm.

In the liquid crystal display device 51 of the present invention illustrated in FIG. 6 and FIG. 7, the optical film 10 is a laminated body 3 of the optical thin film and the layer directly adjacent to the optical thin film. In FIG. 6 and FIG. 7, the laminated body 3 of the optical thin film and the layer directly adjacent to the optical thin film corresponds to a laminated body of the optical thin film 1 and a substrate 2. In FIG. 6 and FIG. 7, the layer directly adjacent to the optical thin film corresponds to the substrate 2. The optical film 10 is arranged on both of the surfaces of the light conversion layer 16 containing the fluorescent material, and is preferably arranged as a barrier film.

Figure 2:
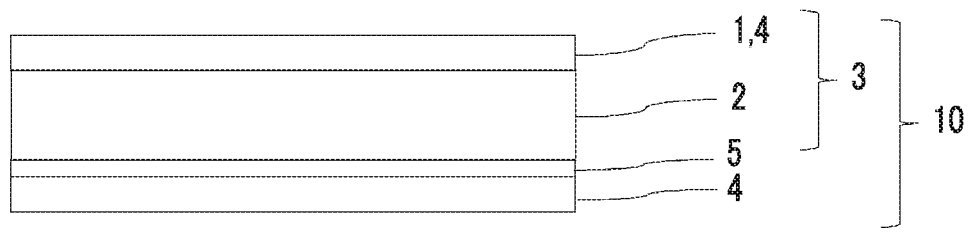
FIG. 2 is a schematic view illustrating a sectional surface of another example of the optical film of the present invention.
Figure 3:
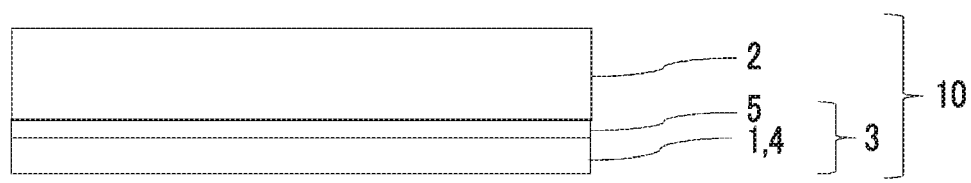
FIG. 3 is a schematic view illustrating a sectional surface of another example of the optical film of the present invention.

The configuration of the optical film 10 is not limited to the configuration illustrated in FIG. 6 and FIG. 7. In FIG. 1 to FIG. 3, a schematic view of an example of the optical film 10 of the present invention is illustrated.

The optical film 10 illustrated in FIG. 1 has the same configuration as that of the optical film 10 illustrated in FIG. 6 and FIG. 7. In FIG. 1, the laminated body 3 of the optical thin film and the layer directly adjacent to the optical thin film corresponds to the laminated body of the optical thin film 1 and the substrate 2.

The optical film 10 illustrated in FIG. 2 has a configuration in which a first organic film 4, the substrate 2, an inorganic film 5, and a second organic film 4 are laminated in this order. In FIG. 2, the optical thin film 1 is the first organic film 4, and the substrate 2 is the layer directly adjacent to the optical thin film. That is, in FIG. 2, the laminated body 3 of the optical thin film and the layer directly adjacent to the optical thin film corresponds to the laminated body of the optical thin film 1 which also serves as the first organic film 4, and the substrate 2.

The optical film 10 illustrated in FIG. 3 has an optical film configuration in which the substrate 2, the inorganic film 5, and the organic film 4 are laminated in this order. In FIG. 3, the optical thin film 1 is the organic film 4, and the inorganic film 5 is the layer directly adjacent to the optical thin film. In FIG. 3, the laminated body 3 of the optical thin film and the layer directly adjacent to the optical thin film corresponds to the laminated body of the optical thin film 1 which also serves as the organic film 4, and the inorganic film 5.

Figure 4:
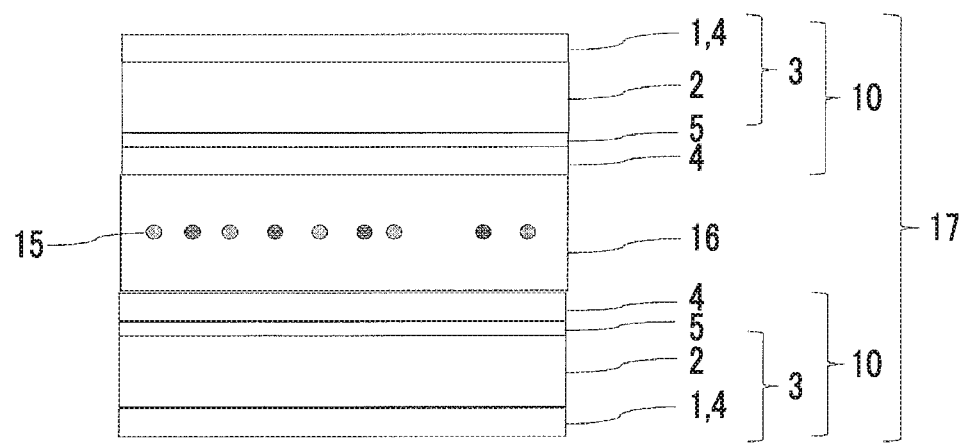
FIG. 4 is a schematic view illustrating a sectional surface of an example of a light conversion member of the present invention.
Figure 5:
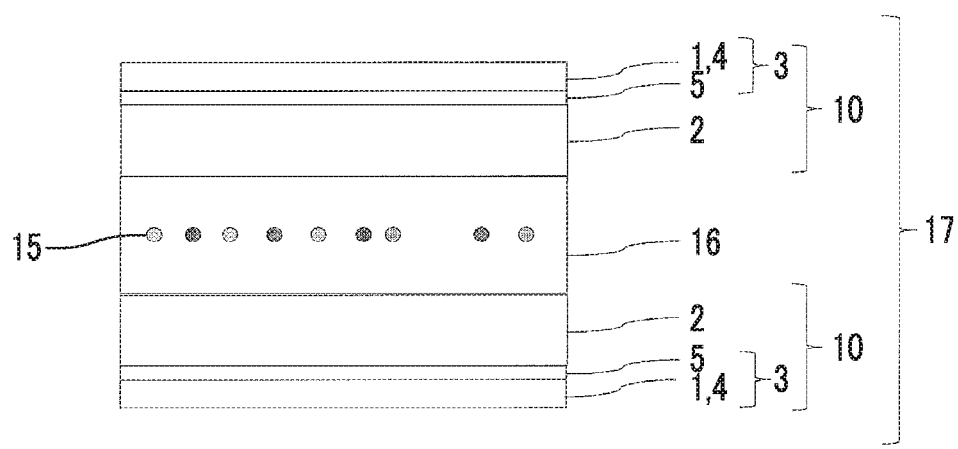
FIG. 5 is a schematic view illustrating a sectional surface of another example of the light conversion member of the present invention.

In addition, the light conversion member 17 is not limited to the configuration illustrated in FIG. 6 and FIG. 7. In FIG. 4 and FIG. 5, a schematic view of an example of the light conversion member 17 of the present invention is illustrated.

The light conversion member 17 illustrated in FIG. 4 has a configuration including the light conversion layer 16 containing the fluorescent material, and the optical film 10 of the present invention illustrated in FIG. 2 which is arranged on both of the surfaces of the light conversion layer 16 containing the fluorescent material.

The light conversion member 17 illustrated in FIG. 5 has a configuration including the light conversion layer 16 containing the fluorescent material, and the optical film 10 of the present invention illustrated in FIG. 3 which is arranged on both of the surfaces of the light conversion layer 16 containing the fluorescent material.

The light conversion member 17 of the present invention may have a configuration (a configuration illustrated in FIG. 4 and FIG. 5) in which two optical films arranged on both of the surfaces of the light conversion layer 16 containing the fluorescent material are identical to each other, or may have a configuration (not illustrated) in which two optical films arranged on both of the surfaces of the light conversion layer 16 containing the fluorescent material are different from each other.

As illustrated in FIG. 6 and FIG. 7, it is preferable that the liquid crystal display device 51 of the present invention includes a backlight side polarizing plate 14 on the surface of the liquid crystal cell 21 on the backlight side.

The backlight side polarizing plate 14 of the liquid crystal display device 51 of the present invention may or may not include a polarizing plate protective film 11 on the surface of the backlight side polarizer 12 on the backlight side, and it is preferable that the backlight side polarizing plate 14 of the liquid crystal display device 51 of the present invention includes a polarizing plate protective film 11.

It is preferable that the backlight side polarizing plate 14 has a configuration in which the polarizer 12 is interposed between two polarizing plate protective films 11 and 13.

Herein, the polarizing plate protective film on a side of the polarizer close to the liquid crystal cell indicates an inner side polarizing plate protective film, and the polarizing plate protective film on a side of the polarizer separated from the liquid crystal cell indicates an outer side polarizing plate protective film. In FIG. 6 and FIG. 7, the polarizing plate protective film 13 is the inner side polarizing plate protective film, and the polarizing plate protective film 11 is the outer side polarizing plate protective film.

As illustrated in FIG. 6 and FIG. 7, it is preferable that the liquid crystal display device 51 of the present invention includes a display side polarizing plate 44 on the surface of the liquid crystal cell 21 on a side opposite to the backlight side. It is preferable that the display side polarizing plate 44 has a configuration in which the polarizer 42 is interposed between two polarizing plate protective films 51 and 43. In FIG. 6 and FIG. 7, the polarizing plate protective film 43 is the inner side polarizing plate protective film, and the polarizing plate protective film 41 is the outer side polarizing plate protective film.

In the liquid crystal display device 51 of the present invention illustrated in FIG. 6 and FIG. 7, it is preferable that the backlight unit 31 includes a light source 31A. In addition, it is preferable that the backlight unit 31 includes a light guide plate 31B as a surface light source.

It is preferable that an example of a preferred aspect of the liquid crystal display device 51 of the present invention is a configuration illustrated in FIG. 6, the backlight unit 31 includes the light guide plate 31B, and the light conversion member 17 is arranged between the light guide plate 31B and the liquid crystal cell 21. It is preferable that the liquid crystal display device 51 illustrated in FIG. 6 further includes the light source 31A. In the configuration of FIG. 6, blue light 32 exiting from the light source 31A arranged on an edge portion of the light guide plate 31B exits from the surface of the light guide plate 31B on the liquid crystal cell 21 side towards the liquid crystal cell 21. Further, in the configuration of FIG. 6, it is preferable that the light conversion member 17 is arranged on a path of light (the blue light 32) exiting from the light guide plate 31B. The fluorescent material 15 contained in the light conversion layer 16 containing the fluorescent material of the light conversion member 17 exits green light 33 and red light 34 excited by the incident blue light 32. Thus, the excited green light 33 and red light 34, and the blue light 32 transmitted through the light conversion member 17 exit from the backlight unit, and are respectively incident on the backlight side polarizing plate 14.

It is preferable that the another example of the preferred aspect of the liquid crystal display device 51 of present invention is a configuration illustrated in FIG. 7, the backlight unit 31 includes the light guide plate 31B and the light source 31A, and the light conversion member 17 is arranged between the light guide plate 31B and the light source 31A. In the configuration of FIG. 7, the blue light 32 exiting from the light source 31A arranged on the edge portion of the light guide plate 31B exits from the surface of the light guide plate 31B on the liquid crystal cell 21 side towards the liquid crystal cell 21, and the fluorescent material 15 contained in the light conversion layer 16 containing the fluorescent material of the light conversion member 17 which is arranged between the light guide plate 31B and the light source 31A exits the green light 33 and the red light 34 excited by the incident blue light 32. Thus, the excited green light 33 and red light 34, and the blue light 32 transmitted through the light conversion member 17 exit from the light conversion member 17, and are incident on the light guide plate 31B. The blue light 32, green light 33, and the red light 34 which are incident on the light guide plate 31B exit from the surface of the light guide plate 31B on the liquid crystal cell 21 side towards the liquid crystal cell 21, and are respectively incident on the backlight side polarizing plate 14.

<Backlight Unit>

The liquid crystal display device of the present invention includes the backlight unit including the light conversion member.

The light conversion member includes the light conversion layer containing the fluorescent material, and the optical film arranged on both of the surfaces of the light conversion layer containing the fluorescent material.

(Optical Film)

The optical film described above includes the optical thin film forming the air interface, and the layer directly adjacent to the optical thin film.

The laminated body of the optical thin film and the layer directly adjacent to the optical thin film satisfies the following Expression (1).

The optical thin film described above satisfies any one of the following Expressions (2-1), (2-2), and (2-3).

In the optical film described above, all transmittances of the optical film at a Y value in an XYZ color system at a wavelength of 430 nm to 470 nm, a wavelength of 515 nm to 555 nm, and a wavelength of 600 nm to 650 nm are greater than transmittance at a Y value in an XYZ color system at a wavelength of greater than 470 nm and less than 515 nm and a wavelength of greater than 555 nm and less than 600 nm.

$$n(535) < nu(535) \quad \text{Expression (1)}$$

(In Expression (1), n(535) represents a refractive index of the optical thin film at a wavelength of 535 nm, and nu(535) represents a refractive index of the layer directly adjacent to the optical thin film at a wavelength of 535 nm)

$$1.15 \ \mu m \leq n(535) \times d \leq 1.25 \ \mu m \quad \text{Expression (2-1)}$$

$$1.42 \ \mu m \leq n(535) \times d \leq 1.52 \ \mu m \quad \text{Expression (2-2)}$$

$$1.69 \ \mu m \leq n(535) \times d \leq 1.79 \ \mu m \quad \text{Expression (2-3)}$$

(In Expressions (2-1), (2-2), and (2-3), n(535) represents a refractive index of the optical thin film at a wavelength of 535 nm, and d represents a thickness of the optical thin film (unit: μm).)

In the transmittance at the Y value in the XYZ color system, a value obtained by dividing a Y value which is obtained by irradiating the optical film with light source light transmitted through the conversion member containing the fluorescent material and QDOT, and by measuring the transmitted light using a spectroradiometer SR-3 (manufactured by TOPCON CORPORATION) by a Y value which is obtained by measuring light which is not transmitted through the optical film using a spectroradiometer SR-3 is able to be applied as the transmittance of the Y value. In this case, the Y value is a value which is able to be calculated by an internal program of the spectroradiometer SR-3, and specifically, is defined by $$L = K_m \int_{vts} S_t(\lambda) \bar{y}(\lambda) d\lambda,$$

in which Km represents the maximum luminous efficacy, St(λ) represents spectral energy density, and y(λ) represents a color matching function of a green component.

In addition, transmittance wavelength dependency T(λ) of a film is measured by using a spectrophotometer V-550 (manufactured by JASCO CORPORATION), and spectral energy density Si(λ) of the light transmitted through the conversion member containing QDOT is measured by a spectroradiometer SR-3. According to this, the spectral energy density St(λ)=T(λ)×Si(λ) of the transmitted light of the film is obtained, and thus the transmittance of the Y value is able to be calculated. The contents described above are disclosed in p. 19 of an instruction manual of LCD master manufactured by Shintech Inc.

The liquid crystal display device of the present invention includes the optical film of the present invention as the laminated body of the optical thin film and the layer directly adjacent to the optical thin film.

Hereinafter, the laminated body of the optical thin film and the layer directly adjacent to the optical thin film will be described.

The laminated body of the optical thin film and the layer directly adjacent to the optical thin film satisfies the following Expression (1).

$$n(535) < nu(535) \quad \text{Expression (1)}$$

(In Expression (1), n(535) represents a refractive index of the optical thin film at a wavelength of 535 nm, and nu(535) represents a refractive index of the layer directly adjacent to the optical thin film at a wavelength of 535 nm.)

When the refractive index n(535) of the optical thin film is smaller than the refractive index nu(535) of the layer directly adjacent to the optical thin film, the effects of the present invention are obtained. It is preferable that n(535)={nu(535)}$^{1/2}$ from a viewpoint of increasing transmittance, and the refractive index nu of the layer directly adjacent to the optical thin film is able to actually select the material in consideration of the cost and coating properties of the material.

In the liquid crystal display device of the present invention, it is preferable that all transmittances of the laminated body of the optical thin film and the layer directly adjacent to the optical thin film at a Y value in an XYZ color system at a wavelength of 430 nm to 470 nm, a wavelength of 515 nm to 555 nm, and a wavelength of 600 nm to 650 nm are greater than or equal to 97%. It is more preferable that the transmittance of the laminated body of the optical thin film and the layer directly adjacent to the optical thin film at the Y value in the XYZ color system at the wavelength of 515 nm to 555 nm is greater than or equal to 98%, and it is particularly preferable that all of the transmittances of the laminated body of the optical thin film and the layer directly adjacent to the optical thin film at the Y value in the XYZ color system at the wavelength of 430 nm to 470 nm, the wavelength of 515 nm to 555 nm, and the wavelength of 600 nm to 650 nm are greater than or equal to 98%.

It is preferable that all transmittances of the laminated body of the optical thin film and the layer directly adjacent to the optical thin film at a Y value in an XYZ color system at a wavelength of 440 nm to 460 nm, a wavelength of 525 nm to 545 nm, and a wavelength of 610 nm to 640 nm are greater than or equal to 97%. It is more preferable that the transmittance of the laminated body of the optical thin film and the layer directly adjacent to the optical thin film at the Y value in the XYZ color system at the wavelength of 525 nm to 545 nm is greater than or equal to 98%, and it is particularly preferable that all of the transmittances of the laminated body of the optical thin film and the layer directly adjacent to the optical thin film at the Y value in the XYZ color system at the wavelength of 440 nm to 460 nm, the wavelength of 525 nm to 545 nm, and the wavelength of 610 nm to 640 nm are greater than or equal to 98%.

In addition, in the liquid crystal display device of the present invention, it is preferable that all transmittances of the laminated body of the optical thin film and the layer directly adjacent to the optical thin film at a Y value in an XYZ color system at a wavelength of greater than 470 nm and less than 515 nm and a wavelength of greater than 555 nm and less than 600 nm are less than 97%. It is more preferable that all of the transmittances of the laminated body of the optical thin film and the layer directly adjacent to the optical thin film at the Y value in the XYZ color system at the wavelength of greater than 470 nm and less than 515 nm and the wavelength of greater than 555 nm and less than 600 nm are less than or equal to 96%.

It is preferable that all transmittances of the laminated body of the optical thin film and the layer directly adjacent to the optical thin film at a Y value in an XYZ color system at a wavelength of greater than 480 nm and less than 505 nm and a wavelength of greater than 565 nm and less than 590 nm are less than 97%. It is more preferable that all of the transmittances of the laminated body of the optical thin film and the layer directly adjacent to the optical thin film at the Y value in the XYZ color system at the wavelength of greater than 480 nm and less than 505 nm and the wavelength of greater than 565 nm and less than 590 nm are less than or equal to 96%.

In the present invention, it is preferable that the optical film is the barrier film.

It is preferable that the barrier film is used for the light conversion member containing the fluorescent material, and it is more preferable that the barrier film is used for a light conversion member containing a quantum dot.

It is preferable that oxygen permeability of the barrier film is less than or equal to 0.5 $cm^3/m^2/day/atm$. A preferred range of gas barrier performance of the barrier film will be described below.

—Optical Thin Film—

The optical thin film is a low refractive index layer in which the refractive index n(535) of the optical thin film at a wavelength of 535 nm is lower than the refractive index nu(535) of the layer directly adjacent to the optical thin film.

It is preferable that the refractive index n(535) of the optical thin film at the wavelength of 535 nm is 1.20 to 1.51. The refractive index n(535) of the optical thin film at the wavelength of 535 nm is more preferably 1.30 to 1.46, and is even more preferably 1.40 to 1.46. By setting the refractive index n(535) of the optical thin film at the wavelength of 535 nm to be in the range described above, it is possible to suppress reflectivity, to increase light transmittance, and to maintain film strength, and thus setting the refractive index n(535) of the optical thin film at the wavelength of 535 nm to be in the range described above is preferable.

The optical thickness of the optical thin film in which the refractive index and the film thickness are multiplied satisfies any one of the following Expressions (2-1), (2-2), and (2-3).

$$1.15 \text{ μm} \leq n(535) \times d \leq 1.25 \text{ μm} \quad \text{Expression (2-1)}$$

$$1.42 \text{ μm} \leq n(535) \times d \leq 1.52 \text{ μm} \quad \text{Expression (2-2)}$$

$$1.69 \text{ μm} \leq n(535) \times d \leq 1.79 \text{ μm} \quad \text{Expression (2-3)}$$

(In Expressions (2-1), (2-2), and (2-3), n(535) represents a refractive index of the optical thin film at a wavelength of 535 nm, and d represents a thickness of the optical thin film (unit: μm).)

In the liquid crystal display device of the present invention, it is preferable that the optical thin film satisfies any one of the following Expressions (2-1A), (2-2A), and (2-3A).

$$1.16 \text{ μm} \leq n(535) \times d \leq 1.24 \text{ μm} \quad \text{Expression (2-1A)}$$

$$1.46 \text{ μm} \leq n(535) \times d \leq 1.51 \text{ μm} \quad \text{Expression (2-2A)}$$

$$1.70 \text{ μm} \leq n(535) \times d \leq 1.78 \text{ μm} \quad \text{Expression (2-3A)}$$

(In Expressions (2-1A), (2-2A), and (2-3A), n(535) represents a refractive index of the optical thin film at a wavelength of 535 nm, and d represents a thickness of the optical thin film (unit: μm).)

In the liquid crystal display device of the present invention, it is preferable that the optical thin film satisfies Expression (2-2A) described above.

Furthermore, the thickness d of the optical thin film is not particularly limited insofar as the thickness d satisfies the range of the optical thickness described above, but is preferably 0.5 μm to 2 μm, and is more preferably 0.7 μm to 1.5 μm.

The oxygen permeability of the optical film described above is less than or equal to 0.5 $cm^3/m^2/day/atm$, is preferably less than or equal to 0.1 $cm^3/m^2/day/atm$, and is particularly preferably less than or equal to 0.05 $cm^3/m^2/day/atm$. By setting the oxygen permeability of the optical film to be in the range described above, when the barrier layer is disposed on the surface of the light conversion layer containing the fluorescent material, it is possible to suppress invasion of oxygen to the light conversion layer, and as a result thereof, the amount of oxygen used in a photooxidation reaction of the surface of the fluorescent material (in particular, a quantum dot) due to excitation is able to be reduced, and the photooxidation reaction is able to be suppressed, and thus a decrease in brightness is able to be suppressed. In addition, it is possible to suppress a decrease in brightness after irradiation of B light for a long period of time.

Water vapor permeability is less than or equal to 0.5 $g/m^2/day$, is preferably less than or equal to 0.1 $g/m^2/day$, and is particularly preferably less than or equal to 0.05 $g/m^2/day$. By setting the oxygen permeability and the water vapor permeability of the optical film to be in the range described above, it is possible to increase gas barrier properties, and it is possible to use the optical film, for example, in a liquid crystal display element including a member which is susceptible to oxygen, water vapor, or the like.

Here, the oxygen permeability described above is a value measured by using a oxygen gas transmittance measurement device (manufactured by MOCON Inc., OX-TRAN 2/20: product name) under conditions of a measurement temperature of 23° C. and relative humidity of 90%, and the water vapor permeability is a value measured by using a water vapor permeability measurement device (manufactured by MOCON Inc., PERMATRAN-W 3/31: product name) under conditions of a measurement temperature of 37.8° C. and relative humidity of 100%.

The optical thin film is not particularly limited insofar as the optical thin film is a layer having a refractive index in the range described above, and known constituents are able to be used as the constituents of the optical thin film.

In the liquid crystal display device of the present invention, it is preferable that the optical film is an optical film in which at least the first organic film, the substrate, the inorganic film, and the second organic film are laminated in this order, the optical thin film is the first organic film, and the substrate is the layer directly adjacent to the optical thin film.

In addition, in the liquid crystal display device of the present invention, it is preferable that the optical film is an optical film in which at least the substrate, the inorganic film, and the organic film are laminated in this order, the optical thin film is the organic film, and the inorganic film is the layer directly adjacent to the optical thin film.

A preferred laminating aspect of each layer forming the optical film is not particularly limited, and it is preferable that at least one layer of the inorganic film is directly adjacent to the substrate. In addition, it is preferable that the inorganic film is directly adjacent to at least one layer of the organic film. Examples of other laminating aspects are able to include laminating aspects disclosed in JP2005-96108A, JP2007-290369A, and US2012/0113672A.

Hereinafter, a preferred aspect of each of the layers forming the optical film will be described.

—Substrate—

When the substrate is the layer directly adjacent to the optical thin film, the refractive index nu(535) of the substrate is preferably greater than 1.46 and less than or equal to 1.70, and is more preferably 1.47 to 1.60, is particularly preferably 1.47 to 1.55, and is more particularly preferably 1.47 to 1.50.

The substrate used in the present invention is not particularly limited, and in the present invention, it is preferable that the substrate is a transparent substrate which is transparent with respect to visible light. In the present invention, for example, a glass plate, a film-like substrate or a sheet-like substrate formed of an organic material, and the like are able to be used as such a transparent substrate.

In addition, examples of the organic material used as the transparent substrate of the present invention include a polyarylate resin, a polycarbonate resin, a crystallization polyethylene terephthalate resin, a polyethylene terephthalate resin, a polyethylene naphthalate resin, a UV thermosetting methacrylic resin, a polyether sulfone resin, a polyether ether ketone resin, a polyether imide resin, a polyphenylene sulfide resin, a polyimide resin, and the like.

Here, in the present invention, it is preferable that the substrate has heat resistance, and examples of such an organic material having heat resistance include a polar polymer having a cycloalkyl skeleton. Specifically, examples of such an organic material having heat resistance are able to include an acrylate compound or a methacrylate compound having a cycloalkyl skeleton, a derivative thereof, and the like. Among them, examples of such an organic material having heat resistance are able to include a resin composition including a (meth)acrylate compound having a cycloalkyl skeleton as disclosed in JP1999-222508A (JP-H11-222508A) (indicates an acrylate compound or a methacrylate compound in the present invention) and a derivative thereof.

In addition, two or more types of organic materials described above, for example, a polyester-based resin such as a cyclic polyolefin-based resin, a polystyrene-based resin, an acrylonitrile-styrene copolymer (an AS resin), an acrylonitrile-butadiene-styrene copolymer (an ABS resin), a poly(meth)acrylic resin, a polycarbonate-based resin, polyethylene terephthalate, and polyethylene naphthalate, a polyamide-based resin such as various nylons, a polyurethane-based resin, a fluorine-based resin, an acetal-based resin, a cellulose-based resin, a polyether sulfone-based resin, and the like are able to be used together as the substrate used in the present invention.

In the present invention, for example, one or more types of various resins described above are used in a method of forming the substrate by using the organic material as described above, and examples of the method of forming the substrate include a method of independently performing film formation with respect to various resins described above by using an extruding method, a cast molding method, a T die method, a cutting method, an inflation method, and other film formation methods, a film formation method of performing multilayer coextrusion with respect to two or more types of various resins, a film formation method of mixing two or more types of resins before the film formation, and the like. In addition, when a resin film or sheet of each layer is manufactured and is stretched by such a film formation method, for example, various resin films or sheets formed by being stretched in a monoaxial direction or a biaxial direction by using a tenter method, a tubular method, or the like are able to be used. In addition, various resin films or sheets described above are able to be used by being bonded.

In addition, when the film formation is performed by using one or more types of various resins described above, for example, in order to enhance and modify workability, heat resistance, weather resistance, mechanical properties, dimensional stability, anti-oxidizing properties, slipperiness, releasability, flame-retardance, antifungal properties, electrical properties, strength, and the like of the film, various plastic compounding agents or additives are able to be added. The added amount is able to be arbitrarily set from a trace amount to several 10%, according to the purpose. In the above description, a lubricant, a cross-linking agent, an antioxidant, an ultraviolet absorbent, a light stabilizer, a filler, a strengthening agent, an antistatic agent, a pigment, and the like are able to be used as a general additive. In addition, a resin for enhancement or the like is also able to be used.

In the present invention, when the substrate is formed by using the organic material as described above, the thickness of the substrate is in a range of 10 μm to 500 μm, is preferably in a range of 50 μm to 400 μm, and is particularly preferably in a range of 100 μm to 300 μm. The reason for setting thickness of the substrate to be in the range described above is that when the film thickness is thicker than the range described above, impact resistance deteriorates at the time of process an anti-reflection gas barrier substrate of the present invention or it is difficult to wind the substrate at the time of winding, and gas barrier properties with respect to water vapor, oxygen, or the like deteriorate. In addition, the reason for setting thickness of the substrate to be in the range described above is that when the film thickness is thinner than the range described above, machinability deteriorates, and gas barrier properties with respect to water vapor, oxygen, or the like decrease.

In addition, in the optical film of the present invention, heat resistance of the substrate is realized at a temperature of higher than or equal to 150° C., is preferably realized at a temperature of higher than or equal to 200° C., and is particularly realized at a temperature of higher than or equal to 250° C.

Preferred aspects of other substrates are able to include aspects of the substrate disclosed in JP2007-290369A and US2012/0113672A.

—Organic Film—

The organic film is not particularly limited insofar as the organic film has excellent adhesiveness with respect to the inorganic film and is able to form a flat film. In addition, the first organic film and the second organic film may have the same configuration or may have different configurations, and it is preferable that the first organic film and the second organic film have the same configuration.

Examples of a specific forming material include a thermosetting resin, a photocurable resin, a photo-heat combination type curable resin, metal alkoxide, and the like.

A phenol resin, a urea resin, a diallyl phthalate resin, a melamine resin, a guanamine resin, an unsaturated polyester resin, a polyurethane resin, an epoxy resin, an aminoalkyd resin, a melamine-urea copolymer resin, and the like are able to be used as the thermosetting resin described above. The thermosetting resins, as necessary, are used by adding a curing agent such as a cross-linking agent and a polymerization initiator, a polymerization accelerator, and the like thereto.

In addition, examples of a resin composition including the photocurable resin or the photo-heat combination type curable resin described above are able to include (i) a resin composition formed of an acrylic multifunctional monomer and oligomer having a plurality of acryloyl groups or methacryloyl groups, and a photopolymerization initiator or a thermal polymerization initiator, (ii) a resin composition formed of polyvinyl cinnamic acid ester and a sensitizer, (iii) a resin composition formed of a chain or cyclic olefin and bisazide, (iv) a resin composition formed of a monomer having an epoxy group and an acid generator, and the like. In particular, (i) the resin composition formed of the acrylic multifunctional monomer and oligomer and the photopolymerization initiator or the thermal polymerization initiator is preferable from a viewpoint of high reliability such as solvent resistance and heat resistance. By applying light and/or heat to the resin composition described above, the photocurable resin or the photo-heat combination type curable resin is formed. In addition, when the photo-heat combination type curable resin is used, it is preferable that the average molecular weight of the photo-heat combination type curable resin is greater than or equal to 3000 from a viewpoint of capable of setting a softening point to be higher than or equal to 45° C.

Further, examples of a metal element of the metal alkoxide described above are able to include Si, Al, Sr, Ba, Pb, Ti, Zr, La, Na, and the like. Specifically, examples of the metal alkoxide are able to include an alkoxy silane compound such as tetramethoxy silane, tetraethoxy silane, tetraisopropoxy silane, tetrabutoxy silane, dimethyl dimethoxy silane, trimethoxy methyl silane, dimethyl diethoxy silane, [2-(3-cyclohexenyl)ethyl]trimethoxy silane, [2-(3-cyclohexenyl) ethyl]triethoxy silane, cyclohexyl ethyl dimethoxy silane, cyclohexyl methyl dimethoxy silane, cyclohexyl trimethoxy silane, (3-cyclopentadienyl propyl) triethoxy silane, and cyclopentyl trimethoxy silane; a zirconium alkoxide compound such as tetramethoxy zirconium, tetraethoxy zirconium, tetraisopropoxy zirconium, and tetrabutoxy zirconium; a titanium alkoxide compound such as tetramethoxy titanium, tetraethoxy titanium, tetraisopropoxy titanium, and tetrabutoxy titanium, and the like. One type or two or more types of metal alkoxides are able to be used by being combined. It is particularly preferable that the alkoxy silane compound is used as the metal alkoxide described above from a viewpoint of handling properties, curing reactivity, economic efficiency, and other properties.

In addition, a silane coupling agent is able to be added to the alkoxy silane compound described above as a cross-linking agent or the like. For example, one type or two or more types of γ-chloropropyl trimethoxy silane, vinyl trichlorosilane, vinyl triethoxy silane, vinyl-tris(β-methoxy ethoxy) silane, γ-methacryl oxy propyl trimethoxy silane, β-(3,4-epoxy cyclohexyl) ethyl trimethoxy silane, γ-glycidoxy propyl trimethoxy silane, vinyl triacetoxy silane, γ-mercaptopropyl trimethoxy silane, N-β-(aminoethyl)-γ-aminopropyl trimethoxy silane, N-β-(aminoethyl)-γ-aminopropyl methyl dimethoxy silane, γ-ureide propyl triethoxy silane, bis(β-hydroxy ethyl)-γ-aminopropyl triethoxy silane, γ-aminopropyl silicone are able to be used by being combined as the silane coupling agent. Only a trace amount of silane coupling agent may be added.

A transparent film of amorphous ceramics is able to be formed by performing a hydrolysis reaction and a polycondensation reaction with respect to such metal alkoxide in the coexistence of water or alcohol or by adding an organic matter or a catalyst to the metal alkoxide during the reaction or after the reaction, by increasing the molecular weight of the metal alkoxide, and by heating the metal alkoxide. The film formed by using the metal alkoxide has high gas barrier properties, and thus is useful as an organic film.

In addition, a organic silicon compound such as hexamethyl disiloxane, octatetramethyl silane, cyclopentasiloxane, decamethyl cyclopentasiloxane, 2,2,5,5-tetramethyl-2,5-disila-1-oxacyclopentane, (cyclohexenyloxy) trimethyl silane, cyclopentadienyl trimethyl silane, cyclopentamethylene dimethyl silane, (cyclopentenyloxy) trimethyl silane, cyclotetramethyl dimethyl silane, and cyclotrimethylene dimethyl silane is able to be used as the forming material of the organic film, in addition to the alkoxy silane compound described above.

In the present invention, a material including a Cardo polymer is preferable as the forming material of the organic film described above. Accordingly, it is possible to make adhesiveness between the organic film and the inorganic film more excellent, and it is possible to more effectively fill up a pinhole on the inorganic film. In addition, by including the Cardo polymer, an organic film having excellent flatness is formed, and thus a second inorganic film is more closely formed on the organic film, and it is possible to increase gas barrier properties.

The organic film includes the Cardo polymer, and thus adhesiveness with respect to the inorganic film becomes excellent, and it is possible to increase gas barrier properties.

Examples of such a Cardo polymer include Cardo polymers having (i) an addition product of an epoxy acrylate resin having a fluorene skeleton and a polybasic acid anhydride, (ii) multifunctional acrylate monomer, (iii) a polymerization initiator, and (iv) an epoxy resin having two or more epoxy groups in one molecule as an essential component.

In addition, it is preferable that the Cardo polymer used in the present invention contains a resin having a fluorene skeleton derived from a bisphenol compound denoted by the following General Formula (1).

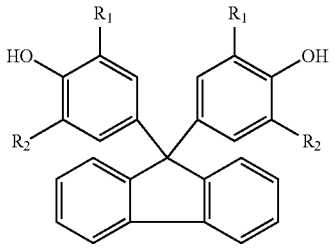

($R_1$ and $R_2$ represent a hydrogen atom, an alkyl group having 1 to 5 carbon atoms, or a halogen atom, and $R_1$ and $R_2$ may be identical to each other or different from each other.)

Specifically, examples of the bisphenol compound denoted by General Formula (1) are able to include 9,9-bis (4-hydroxy phenyl) fluorene, 9,9-bis(4-hydroxy-3-methyl phenyl) fluorene, 9,9-bis(4-hydroxy-3-chlorophenyl) fluorene, 9,9-bis(4-hydroxy-3-bromophenyl) fluorene, 9,9-bis(4-hydroxy-3-fluorophenyl) fluorene, 9,9-bis(4-hydroxy-3-methoxy phenyl) fluorene, 9,9-bis(4-hydroxy-3,5-dimethyl phenyl) fluorene, 9,9-bis(4-hydroxy-3,5-dichlorophenyl) fluorene, 9,9-bis(4-hydroxy-3,5-dibromophenyl) fluorene, and the like, and only one type of bisphenol compound is able to be independently used, or two or more types thereof may be used by being combined.

In addition, in the present invention, it is preferable that the Cardo polymer described above is an epoxy (meth) acrylate acid adduct which is derived from an epoxy (meth) acrylate resin obtained by a reaction between an epoxy resin having two or more epoxy groups in one molecule and an unsaturated monocarboxylic acid, and a polybasic acid anhydride.

Specifically, examples of the epoxy resin used for forming such an epoxy (meth)acrylate acid adduct include bisphenols such as bis(4-hydroxy phenyl) ketone, bis(4-hydroxy phenyl) sulfone, 2,2-bis(4-hydroxy phenyl) propane, bis(4-hydroxy phenyl) ether, bis(4-hydroxy phenyl) hexafluoropropane, 9,9-bis(4-hydroxy phenyl) fluorene, bis(4-hydroxy phenyl) dimethyl silane, 4,4'-biphenol, and tetramethyl-4,4'-biphenol, multifunctional phenols such as phenol novolak, cresol novolak, and a condensation compound of naphthol or naphthalene diol and 1,4-bisxylenol, and an epoxy resin having two or more epoxy groups in one molecule obtained by a reaction between the multifunctional phenols in which a part or all of aromatic ring hydrogen thereof is substituted with a halogen atom or an alkyl group having 1 to 4 carbon atoms and epichlorohydrin. The epoxy resin reacts with acrylates such as acrylate and methacrylate in the equivalent amount as that of the epoxy resin by a known method, and thus it is possible to obtain an epoxy (meth)acrylate resin, and the epoxy (meth)acrylate resin reacts with a polybasic acid anhydride, and thus it is possible to obtain an addition product between the epoxy (meth)acrylate resin and the polybasic acid anhydride.

Specifically, examples of the polybasic acid anhydride used for forming such an addition product include alicyclic acid anhydrides such as a methyl tetrahydrophthalic anhydride, a methyl hexahydrophthalic anhydride, a methyl himic anhydride, a tetrahydrophthalic anhydride, a hexahydrophthalic anhydride, and a methyl cyclohexene dicarboxylic anhydride, aromatic acid anhydrides such as a phthalic anhydride, a trimellitic anhydride, a pyromellitic anhydride, a benzophenone tetracarboxylic dianhydride, an ethylene glycol bistrimellitate anhydride, a glycerol tristrimellitate anhydride, and a biphenyl tetracarboxylic dianhydride, halogen-based acid anhydrides such as a hettic anhydride and a tetrabromophthalic anhydride, and the like. In addition, the epoxy resin described above, acrylate, and acid anhydrides may be one type of material, or may be a mixture of two or more types thereof.

Among the epoxy (meth)acrylate acid adducts obtained as described above, in the present invention, it is preferable that a resin having a carboxyl group and a polymerizable unsaturated group in the same molecules and a weight average molecular weight of greater than or equal to 1000 is contained in the organic film as disclosed in JP1985-152091A (JP-S60-152091A), JP1994-1938A (JP-H06-1938A), and JP 1996-146311A (JP-H08-146311A). Specifically, examples of the epoxy (meth)acrylate acid adduct include V259M and V301M manufactured by Nippon Steel Chemical Co., Ltd. which is an acid adduct of epoxy acrylate having a fluorene skeleton and an acid adduct of cresol novolak type epoxy acrylate manufactured by Nippon Kayaku Co., Ltd.

In addition, a resin obtained by a reaction between an epoxy resin obtained from 9,9-bis(4-hydroxy phenyl) fluorene and acrylates is preferably used as the epoxy acrylate resin having a fluorene skeleton described above.

In addition, specifically, examples of the multifunctional acrylate monomer used in the present invention described above include a addition polymerizable compound having a boiling point of higher than or equal to 100° C. in atmospheric pressure and at least two ethylenically unsaturated groups in one molecule. Examples of the material include a material obtained by bonding polyhydric alcohol and an α,β-unsaturated carboxylic acid, for example, multifunctional acrylate such as diethylene glycol (meth)acrylate (indicates diacrylate or dimethacrylate, the same applies to the following), triethylene glycol di(meth)acrylate, tetraethylene glycol di(meth)acrylate, trimethylol propane di(meth) acrylate, trimethylol propane tri(meth)acrylate, 1,3-propane diol (meth)acrylate, 1,3-butane diol (meth)acrylate, pentaerythritol tetra(meth)acrylate, dipentaerythritol hexa(meth)acrylate, and dipentaerythritol penta(meth)acrylate or corresponding multifunctional methacrylate, a mixture of 2,2-bis(4-acryloxy diethoxy phenyl) propane, 2,2-bis(4-methacryloxy pentaethoxy phenyl) propane, and 2,2-bis(4-methacryloxy polyethoxy phenyl) propane [manufactured by Shin-Nakamura Chemical Co., Ltd., product name: BEP-500] or the like, a material obtained by adding an α,β-unsaturated carboxylic acid such as acrylate or methacrylate to a glycyl group-containing compound, for example, trimethylol propane triglycidyl ether tri(meth)acrylate, bisphenol A diglycidyl ether di(meth)acrylate, and an acrylate adduct of diglycidyl ether having a fluorene ring (manufactured by Nippon Steel Chemical Co., Ltd., product name: ASF400), unsaturated amides, for example, methylene bisacryloamide, 1,6-hexamethylene bisacryl amide, and the like, and vinyl esters, for example, divinyl succinate, divinyl adipate, divinyl phthalate, divinyl terephthalate, divinyl benzene-1,3-disulfonate, and the like.

Here, the composition of the organic film is not particularly limited. Accordingly, when the organic film includes a thermosetting resin, a thermal polymerization initiator is used as a polymerization initiator, and when the organic film includes a photocurable resin, a photopolymerization initiator is used as a polymerization initiator.

A known photopolymerization initiator is able to be independently used or a plurality of types thereof are able to be used by being combined as such a photopolymerization initiator, and for example, 2-methyl-1-[4-(methyl thio) phenyl]-2-morpholino-propane-1-one (a commercial product, manufactured by BASF SE, Irgacure 907), 2-benzyl-2-dimethyl amino-1-(4-morpholinophenyl) butanone-1 (a commercial product, manufactured by BASF SE, Irgacure 369), bis(2,4,6-trimethyl benzoyl) phenyl phosphine oxide (manufactured by BASF SE, a product name of Irgacure 819), 2,4,6-trimethyl benzoyl diphenyl phosphine oxide (manufactured by BASF SE, Lucirin TPO), 2,4-trichloromethyl-(piperonyl)-6-triazine (a commercial product, manufactured by DKSH Japan K. K., a product name of triazine PP), and the like are able to be used.

In addition, a known thermal polymerization initiator is able to be used as thermal polymerization initiator insofar as the thermal polymerization initiator is able to generate a radical at the time of heating, and is able to form a cured film by polymerizing a thermosetting resin including a Cardo polymer and an unsaturated group of a multifunctional acrylate monomer, but it is preferable that a half-life temperature for 10 hours is higher than or equal to 80° C. and lower than or equal to a curing temperature, and it is more preferable that the half-life temperature for 10 hours is higher than or equal to 100° C. to the curing temperature.

Further, an epoxy compound having a small hydrolyzable chlorine component, for example, less than 1000 ppm, is preferable as the epoxy resin having two or more epoxy groups in one molecule described above, and for example, a tetramethyl diphenyl type epoxy resin YX4000 manufactured by Mitsubishi Chemical Corporation, a cresol novolak type epoxy resin of EOCN series (EOCN1020, 4400, 102S, 103S, 104S, and the like) manufactured by Nippon Kayaku Co., Ltd., a phenol novolak type epoxy resin, a liquid trifunctional epoxy resin ZX-1542 manufactured by Tohto Kasei Co., Ltd., a multifunctional epoxy compound in which a glycidyl group is introduced into a secondary hydroxyl group in an epoxy compound, and the like. In such an epoxy resin, an epoxy group reacts with a carboxyl group in a resin component containing a Cardo polymer by heating, and the reactant is added to the resin containing the Cardo polymer described above and an unsaturated group of multifunctional acrylate, and thus a cross-linking structure is formed.

In addition, in the present invention, an additive such as an antioxidant, an ultraviolet absorbent, and a plasticizer is able to be added to the material of the organic film described above, as necessary. In addition, in order to improve film formation properties and to prevent a pinhole from being generated, a suitable resin or additive may be used. Further, when the organic film is formed, the resin or the additive is able to be prepared by being dissolved or dispersed in a solvent such as diethylene glycol dimethyl ether, cyclohexanone, ethanol, chloroform, tetrahydrofuran, and dioxane.

In the present invention, it is preferable that the optical thin film is the organic film, and for example, an organic film used in a refractive index layer or a low refractive index layer disclosed in "0014" to "0149" of JP2013-254183A is also able to be preferably used in the present invention, and the contents disclosed in the publication are incorporated herein. In addition, as necessary, an additive such as an antioxidant, an ultraviolet absorbent, and a plasticizer is able to be added to the organic film. In addition, a suitable resin or additive may be used.

A formation method of the organic film described above is not particularly limited, and a spin coating method, a spray method, a blade coating method, a dip method, a wet coating method using a roller coater, a land coater, or the like, or a dry coating method using a vapor deposition method is able to be used as the formation method of the organic film.

In the present invention, the film thickness of the organic film described above is preferably in a range of 0.05 μm to 10 μm, and is more preferably in a range of 0.5 μm to 10 μm. At this time, when the organic film described above is formed by a wet coating method, the film thickness of the organic film is in a range of 0.5 μm to 10 μm, and is preferably in a range of 1 μm to 5 μm. In addition, when the organic film described above is formed by a dry coating method, the film thickness of the organic film is in a range of 0.05 μm to 5 μm, and is preferably in a range of 0.05 μm to 1 μm. By setting the film thickness of the organic film formed by the wet coating method or the dry coating method to be in the range described above, it is possible to make adhesiveness with respect to the inorganic film excellent.

Further, when the organic film is the optical thin film, it is preferable that a film thickness d of the organic film is in a preferred range of the film thickness of the optical thin film described above.

In addition, the refractive index of the resin which is the forming material of the organic film described above is generally 1.3 to 1.6, but in the present invention, when the organic film is the optical thin film, it is preferable that the refractive index n(535) of the organic film is in a preferred range of the refractive index of the optical thin film described above.

In the present invention, the effects such as adhesiveness between the inorganic film and the organic film or gas barrier properties are different according to the formation method of the inorganic film described above or the forming material of the organic film described above. For example, when the inorganic film is formed by an ion plating method, it is considered that a material having a hydroxyl group is used in the organic film and the hydroxyl group causes a hydrolysis reaction at the time of forming the organic film on the inorganic film, and thus the organic film has high glass-like oxidation degree, and gas barrier properties are improved. In addition, when the inorganic film is formed by a sputtering method, the organic film is disposed on the inorganic film, a fine pinhole or the like on the inorganic film is filled up, and thus gas barrier properties increase. Further, when the inorganic film is formed by a chemical vapor deposition method, it is considered that the organic film is disposed on the inorganic film, and thus affinity between two films is improved.

Preferred aspects of other organic films are able to include aspects of organic films disclosed in JP2007-290369A and US2012/0113672A.

—Inorganic Film—

The optical film thickness (Film Thickness×Refractive Index) of the inorganic film is in a range of 10 nm to 1000 nm, and is preferably in a range of 10 nm to 200 nm. By setting the film thickness and the refractive index of the inorganic film described above to be in the range described above, it is possible to suppress reflection on the optical film, and it is possible to suppress a decrease in total light transmittance.

In addition, in the present invention, the film thickness of the inorganic film described above is in a range of 10 nm to 500 nm, is preferably in a range of 10 nm to 300 nm, and is particularly preferably in a range of 10 nm to 150 nm. By setting the film thickness of the inorganic film described above to be in the range described above, it is possible to suppress reflection on the optical film, and it is possible to suppress a decrease in total light transmittance. In addition, the reason for setting the film thickness of the inorganic film described above to be in the range described above is that when the film thickness of the inorganic film described above is thinner than the range described above, gas barrier properties with respect to water vapor, oxygen, or the like are likely to decrease, and when the film thickness of the inorganic film described above is thicker than the range described above, for example, a crack or the like is likely to occur at the time of manufacturing the anti-reflection gas barrier substrate of the present invention, and thus gas barrier properties with respect to water vapor, oxygen gas, or the like deteriorate.

In the refractive index of the inorganic film, when the inorganic film is the layer directly adjacent to the optical thin film, the refractive index nu(535) of the inorganic film is in a range of greater than 1.46 and less than or equal to 2.0, is preferably in a range of 1.7 to 2.0, and is particularly preferably in a range of 1.8 to 2.0. In the present invention, as described above, the film thickness and the refractive index of the inorganic film are controlled, and thus it is possible to effectively suppress light reflection on the optical film.

The inorganic film used in the present invention has a function of blocking permeation of water vapor or oxygen. Accordingly, an inorganic film having electrical insulating properties, barrier properties with respect to gas and an organic solvent, and high transparency in a visible region is preferable as the inorganic film. Total light transmittance in a visible region is greater than or equal to 80%, and is preferably greater than or equal to 85% as specific transparency.

The material of such an inorganic film is not particularly limited, but it is preferable that one type or two or more types of a transparent inorganic oxide film, a transparent inorganic oxide nitride film, a transparent inorganic nitride film, and a transparent metal film are used by being combined. In addition, silicon, aluminum, magnesium, titanium, tin, indium, and cerium are preferable as metal contained in the inorganic film, and one type or two or more types thereof may be contained. A silicon oxide film, a silicon oxide nitride film, an aluminum oxide film, a magnesium oxide film, a titanium oxide film, a tin oxide film, and an indium oxide alloy film are preferable as the transparent inorganic oxide film described above. In addition, a silicon nitride film, an aluminum nitride film, and a titanium nitride film are preferable as the transparent inorganic nitride film described above. Further, an aluminum film, a silver film, a tin film, a chromium film, a nickel film, and a titanium film are preferable as the transparent metal film.

In the present invention, among the materials described above, the silicon oxide film or the silicon oxide nitride film is particularly preferable. This is because such a film has excellent adhesiveness with respect to the organic film, and thus even when a pinhole is generated on the silicon oxide film or the silicon oxide nitride film, the organic film is able to effectively fill up the pinhole, and it is possible to increase gas barrier properties.

In addition, in the present invention, in order to improve gas barrier properties, a plurality of inorganic films described above may be laminated, and in this case, the plurality of inorganic films may be identical to each other or different from each other.

The formation method of the inorganic film described above is not particularly limited, but it is preferable that the inorganic film is formed by a vapor deposition method. Specifically, examples of the formation method include a physical vapor deposition method such as a vacuum vapor deposition method in which an inorganic oxide, an inorganic nitride, an inorganic oxide nitride, or metal is used as a raw material, is heated, and is deposited on a substrate; an oxide reaction vapor deposition method in which an inorganic oxide, an inorganic nitride, an inorganic oxide nitride, or metal is used as a raw material, is oxidized by introducing oxygen gas thereto, and is deposited on a substrate; a sputtering method in which an inorganic oxide, an inorganic nitride, an inorganic oxide nitride, or metal is used as a target raw material, is sputtered by introducing argon gas and oxygen gas thereto, and is deposited on a substrate; and an ion plating method in which an inorganic oxide, an inorganic nitride, an inorganic oxide nitride, or metal is heated by plasma beam generated by a plasma gun, and is deposited on a substrate, and when a deposition film of silicon oxide is formed, a chemical vapor deposition method of using an organic silicon compound as a raw material, and the like.

In addition, in the present invention, as described above, it is preferable that the inorganic film is the silicon oxide film or the silicon oxide nitride film, and such a silicon oxide film is able to be formed by using an organic silicon compound as a raw material and by using a low temperature chemical vapor deposition method. Specifically, examples of the organic silicon compound include 1,1,3,3-tetramethyl disiloxane, hexamethyl disiloxane, vinyl trimethyl silane, hexamethyl disilane, methyl silane, dimethyl silane, trimethyl silane, diethyl silane, propyl silane, phenyl silane, vinyl triethoxy silane, tetramethoxy silane, phenyl triethoxy silane, methyl triethoxy silane, octamethyl cyclotetrasiloxane, and the like. In addition, among the organic silicon compounds described above, the tetramethoxy silane (TMOS) and the hexamethyl disiloxane (HMDSO) are preferably used. This is because the tetramethoxy silane and the hexamethyl disiloxane have excellent handling properties and excellent properties of the deposition film.

Preferred aspects of other inorganic films are able to include aspects of inorganic films disclosed in JP2007-290369A and US2012/0113672A.

(Light Conversion Layer Containing Fluorescent Material)

The light conversion layer containing the fluorescent material included in the light conversion member is not particularly limited insofar as the backlight unit emits blue light which has an emission peak wavelength in a wavelength range of 430 nm to 480 nm and a full width at half maximum of less than or equal to 100 nm, green light which has an emission peak wavelength in a wavelength range of 500 nm to 600 nm and a full width at half maximum of less than or equal to 100 nm, and red light which has an emission peak wavelength in a wavelength range of 600 nm to 650 nm and a full width at half maximum of less than or equal to 100 nm, and a known light conversion layer is able to be used.

In the liquid crystal display device of the present invention, all of the full widths at half maximum of the blue light, the green light, and the red light emitted from the backlight unit are preferably less than or equal to 80 nm, are more preferably less than or equal to 50 nm, are particularly preferably less than or equal to 45 nm, and are more particularly preferably less than or equal to 40 nm. Among them, it is even more particularly preferable that the full width at half maximum of the blue light is less than or equal to 30 nm.

An aspect satisfying such an aspect is not particularly limited, but in the present invention, may be an aspect in which the backlight unit includes a blue emission diode emitting blue light and a fluorescent material emitting green light and red light when the blue light of the blue emission diode is incident. The aspect may be an aspect in which the backlight unit includes a blue laser emitting blue light, a green laser emitting green light, and a red laser emitting red light. The aspect may be an aspect in which a blue emission diode emitting blue light, a green emission diode emitting green light, and red emission diode emitting red light are used as the light source of the backlight unit. In addition, the backlight unit may use an ultraviolet light emission diode emitting ultraviolet light, and a fluorescent material emitting blue light, green light, and red light when the ultraviolet light of the ultraviolet light emission diode is incident.

Among them, in the present invention, it is preferable that the backlight unit includes a blue emission diode emitting blue light, and a fluorescent material emitting green light and red light when the blue light of the blue emission diode is incident, and it is more preferable that the backlight unit includes a blue emission diode emitting blue light, and a quantum dot emitting green light and red light when the blue light of the blue emission diode is incident. That is, it is preferable that the light conversion layer containing the fluorescent material includes the fluorescent material emitting the green light and the red light when the blue light is incident, and it is more preferable that the light conversion layer containing the fluorescent material includes the quantum dot emitting the green light and the red light when the blue light is incident.

Examples of the fluorescent material include a yttrium•aluminum•garnet-based yellow fluorescent body or a terbium-aluminum-garnet-based yellow fluorescent body, a quantum dot, and the like. Among them, the quantum dot is preferable. Two or more types of fluorescent materials may be used by being combined. The fluorescent wavelength of the fluorescent material is able to be controlled by changing the particle diameter of the fluorescent body. Furthermore, the quantum dot, and fluorescent materials other then the quantum dot may be used by being combined.

In a liquid crystal image display device of the present invention, it is preferable that the backlight unit includes the blue emission diode emitting the blue light, and a layer containing the fluorescent material emitting the green light and the red light when the blue light of the blue emission diode is incident. It is preferable that the layer containing the fluorescent material emitting the green light and the red light when the blue light of the blue emission diode is incident is a quantum dot member (for example, a quantum dot sheet or a bar-like quantum dot bar). The quantum dot member is not particularly limited, but a known quantum dot member, for example, disclosed in JP2012-169271A, SID'12 DIGEST p. 895, and the like, and the contents of the literatures are incorporated in the present invention. In addition, a quantum dot enhancement Film (QDEF, manufactured by NanoSys Co., Ltd.) is able to be used as such a quantum dot sheet. A QDOT wavelength conversion bar or the like which is included in a backlight unit of a commercially available liquid crystal television KDL46W200A, manufactured by Sony Corporation, is able to be used as the bar-like quantum dot bar.

(Emission Wavelength of Backlight Unit)

In the liquid crystal display device of the present invention, the backlight unit emits blue light which has an emission peak wavelength in a wavelength range of 430 nm to 480 nm and a full width at half maximum of less than or equal to 100 nm, green light which has an emission peak wavelength in a wavelength range of 500 nm to 600 nm and a full width at half maximum of less than or equal to 100 nm, and red light which has an emission peak wavelength in a range of 600 nm to 650 nm and a full width at half maximum of less than or equal to 100 nm.

The wavelength range of the blue light emitted from the backlight unit is preferably 450 nm to 480 nm, and is more preferably 460 nm to 470 nm.

The wavelength range of the green light emitted from the backlight unit is preferably 520 nm to 550 nm, and is more preferably 530 nm to 540 nm.

The wavelength range of the red light emitted from the backlight unit is preferably 610 nm to 650 nm, and is more preferably 620 nm to 640 nm.

(Other Configurations of Backlight Unit)

The backlight unit may be an edge light mode backlight unit including a light guide plate or the like as a configuration member or a direct backlight mode backlight unit, and the edge light mode backlight unit is preferable. In addition, it is preferable that the backlight unit includes a reflection member in the rear portion of the light source. Such a reflection member is not particularly limited, but known reflection members disclosed in JP3416302B, JP3363565B, JP4091978B, JP3448626B, and the like are able to be used, and the contents of the publications are incorporated in the present invention.

It is preferable that the backlight unit further includes a known diffusion plate or diffusion sheet, a prism sheet (for example, BEF or the like), and a light guide device. These other members are disclosed in JP3416302B, JP3363565B, JP4091978B, JP3448626B, and the like, and the contents of the publications are incorporated in the present invention.

<Backlight Side Polarizing Plate>

The backlight side polarizing plate used in the liquid crystal display device of the present invention is identical to a backlight side polarizing plate used in a general liquid crystal display device, and preferably includes a polarizer and two polarizing plate protective films (hereinafter, also referred to as a protective film) arranged on both sides of the polarizer.

A thermoplastic resin having excellent transparency, mechanical strength, heat stability, moisture blocking properties, isotropy, and the like is used in a substrate of the polarizing plate protective film of the backlight side polarizing plate. Specific examples of such a thermoplastic resin include a cellulose ester-based resin, a polyester resin, a polyether sulfone resin, a polysulfone resin, a polycarbonate resin, a polyamide resin, a polyimide resin, a polyolefin resin, a (meth)acrylic resin, a cyclic polyolefin resin (a norbornene-based resin), a polyarylate resin, a polystyrene resin, a polyvinyl alcohol resin, and a mixture thereof.

Among them, the cellulose ester-based resin, the polyester resin, and the (meth)acrylic resin are preferable as the substrate, and the cellulose ester-based resin is more preferable.

The cellulose ester-based resin is ester of cellulose and a fatty acid. Specific examples of such a cellulose ester-based resin include triacetyl cellulose, diacetyl cellulose, tripropyl cellulose, dipropyl cellulose, and the like. Preferred aspects of the cellulose ester-based resin used in a retardation film are identical to preferred aspects of cellulose acylate having degree of acyl substitution of 2.0 to 2.6 which are disclosed in JP2012-068661A, and the contents of the publication are incorporated in the present invention.

Polyethylene terephthalate and polyethylene naphthalate are preferable as the polyester-based resin, and the polyethylene terephthalate is more preferable.

An arbitrary suitable (meth)acrylic resin is able to be adopted as the (meth)acrylic resin, within a range not impairing the effects of the present invention. For example, examples of the (meth)acrylic resin include poly(meth) acrylate ester such as polymethacrylate methyl, methacrylate methyl-(meth)acrylate copolymer, a methacrylate methyl-(meth)acrylate ester copolymer, a methacrylate methyl-acrylate ester-(meth)acrylate copolymer, a (meth) acrylate methyl-styrene copolymer (an MS resin or the like), a polymer having an alicyclic hydrocarbon group (for example, a methacrylate methyl-methacrylate cyclohexyl copolymer, a methacrylate methyl-(meth)acrylate norbornyl copolymer, and the like). It is preferable that examples of the (meth)acrylic resin include alkyl poly(meth)acrylate having 1 to 6 carbon atoms such as poly(meth)acrylate methyl. It is more preferable that examples of the (meth)acrylic resin include a methacrylate methyl-based resin containing methacrylate methyl as a main component (50 mass % to 100 mass %, preferably 70 mass % to 100 mass %).

Specific examples of the (meth)acrylic resin include Acrypet VH or Acrypet VRL20A manufactured by Mitsubishi Rayon Co., Ltd., a (meth)acrylic resin having a ring structure in the molecules which is disclosed in JP2004-70296A, and a (meth)acrylic resin having a high Tg which is obtained by a cross-linking reaction in the molecules or a cyclization reaction in the molecules.

A (meth)acrylic resin having a lactone ring structure is able to be used as the (meth)acrylic resin. This is because the (meth)acrylic resin having a lactone ring structure has high heat resistance and high transparency, and has high mechanical strength by being biaxially stretched.

A norbornene-based resin is preferable as a specific example of the cyclic polyolefin resin. The cyclic olefin-based resin is a general term of resins in which cyclic olefin is polymerized as a polymerization unit, and examples of the cyclic olefin-based resin include resins disclosed in JP1989-240517A (JP-H01-240517A), JP1991-14882A (JP-H03-14882A), JP1991-122137A (JP-H03-122137A), and the like. Specific examples of the cyclic olefin-based resin include a ring-opening (co)polymer of cyclic olefin, an addition polymer of cyclic olefin, a copolymer of cyclic olefin and α-olefin such as ethylene and propylene (representatively, a random copolymer), a graft polymer in which these materials are modified with an unsaturated carboxylic acid or a derivative thereof, a hydride thereof, and the like. Specific examples of the cyclic olefin include a norbornene-based monomer.

Various products have been commercially available as the cyclic polyolefin resin. Specific examples of the cyclic polyolefin resin include product names of "Zeonex" and "Zeonor" manufactured by Zeon Corporation, a product name of "Arton" manufactured by JSR Corporation, a product name of "Topas" manufactured by TICONA GmbH, and a product name of "APEL" manufactured by Mitsui Chemicals, Inc.

The thickness of the polarizing plate protective film or the retardation film described below is able to be suitably set, and is generally approximately 1 μm to 500 μm from a viewpoint of workability such as strength or handling, thin layer properties, and the like. In particular, the thickness of the polarizing plate protective film or the retardation film described below is preferably 1 μm to 300 μm, is more preferably 5 μm to 200 μm, is particularly preferably 5 μm to 150 μm, and is more preferably 10 μm to 80 μm.

A manufacturing method of the substrate is able to include any one of a step of forming a polymer film (the substrate described above) by casting a polymer solution containing a thermoplastic resin and a solvent onto a support and a step of forming the substrate by performing melting film formation with respect to a thermoplastic resin.

Further, the manufacturing method of substrate described above may include a step of stretching the substrate described above (or the polymer film) at least one of a film transport direction and a width direction.

—Backlight Side Polarizer—

The material of the polarizer is not particularly limited, but a known material is able to be used.

A polarizer in which iodine is absorbed and aligned in the polymer film is preferably used as the polarizer. The polymer film is not particularly limited, but various polymer films are able to be used. For example, a polyvinyl alcohol-based film, a polyethylene terephthalate-based film, an ethylene•vinyl acetate copolymer-based film, a partially saponified film thereof, a hydrophilic polymer film such as a cellulose-based film, a polyene-based alignment film of a dehydrated material of polyvinyl alcohol or a dehydrochlorinated material of polyvinyl chloride, and the like. Among them, a polyvinyl alcohol-based film having excellent stainability due to iodine is preferably used as the polarizer.

Polyvinyl alcohol or a derivative thereof is used as the material of the polyvinyl alcohol-based film. Examples of the derivative of the polyvinyl alcohol include polyvinyl formal, polyvinyl acetal, and the like, and olefin of ethylene, propylene, and the like, an unsaturated carboxylic acid such as an acrylic acid, a methacrylic acid, and a crotonic acid, and alkyl ester thereof, and a derivative modified with acryl amide.

The degree of polymerization of the polymer which is the material of the polymer film is generally in a range of 500 to 10,000, is preferably in a range of 1000 to 6000, and is more preferably in a range of 1400 to 4000. Further, in a saponification film, the degree of saponification, for example, is preferably greater than or equal to 75 mol %, is more preferably greater than or equal to 98 mol %, and is even more preferably in a range of 98.3 mol % to 99.8 mol %, from a viewpoint of solubility with respect to water.

The polymer film (an unstretched film) is subjected to at least a monoaxially stretching treatment and iodine dyeing treatment according to a normal method. Further, a boric acid treatment and a washing treatment are able to be performed. In addition, the polymer film (a stretched film) which has been subjected to a treatment becomes a polarizer by being subjected to a drying treatment according to a normal method.

A stretching method in the monoaxially stretching treatment is not particularly limited, and both of a wet stretching method and a dry stretching method are able to be adopted as the stretching method. Examples of stretching means of the dry stretching method include an inter-roll stretching method, a heating roll stretching method, a compression stretching method, and the like. The stretching is able to be performed in multiple steps. In the stretching means described above, the unstretched film is generally in a heated state. A stretching ratio of the stretched film is able to be suitably set according to the purpose, and the stretching ratio (the total stretching ratio) is approximately 2 times to 8 times, is preferably 3 times to 7 times, and is more preferably 3.5 times to 6.5 times.

The iodine dyeing treatment, for example, is performed by dipping the polymer film in an iodine solution containing iodine and potassium iodide. The iodine solution is generally an aqueous solution of iodine, and contains iodine and potassium iodide as a dissolution aid. An iodine concentration is approximately 0.01 mass % to 1 mass %, and is preferably 0.02 mass % to 0.5 mass %, and a potassium iodide concentration is approximately 0.01 mass % to 10 mass %, and is preferably 0.02 mass % to 8 mass %.

In the iodine dyeing treatment, the temperature of the iodine solution is generally approximately 20° C. to 50° C., and is preferably 25° C. to 40° C. A dipping time is generally in a range of approximately 10 seconds to 300 seconds, and is preferably in a range of 20 seconds to 240 seconds. In the iodine dyeing treatment, an iodine content and a potassium content in the polymer film are adjusted to be in the range described above by adjusting conditions such as the concentration of the iodine solution, and the dipping temperature and the dipping time of the polymer film with respect to the iodine solution. The iodine dyeing treatment may be performed before the monoaxially stretching treatment, during the monoaxially stretching treatment, or after the monoaxially stretching treatment.

The iodine content of the polarizer, for example, is in a range of 2 mass % to 5 mass %, and is preferably in a range of 2 mass % to 4 mass %, in consideration of optical properties.

It is preferable that the polarizer contains potassium. A potassium content is preferably in a range of 0.2 mass % to 0.9 mass %, and is more preferably in a range of 0.5 mass % to 0.8 mass %. The polarizer contains the potassium, and thus it is possible to obtain a polarizing film having a preferred composite modulus (Er) and a high polarization degree. The potassium is able to be contained, for example, by dipping the polymer film which is the forming material of the polarizer in a solution containing potassium. The solution described above may also be used as a solution containing iodine.

A drying method of the related art such as natural drying, blast drying, and heating drying is able to be used as a drying treatment step. For example, in the heating drying, a heating temperature is approximately 20° C. to 80° C., and a drying time is approximately 1 minute to 10 minutes. In addition, in this drying treatment step, the stretching is able to be suitably performed.

The thickness of the polarizer is not particularly limited, and is generally 5 μm to 300 μm, is preferably 10 μm to 200 μm, and is more preferably 20 μm to 100 μm.

As optical properties of the polarizer, single transmittance at the time of being measured in a single polarizer is preferably greater than or equal to 43%, and is more preferably in a range of 43.3% to 45.0%. In addition, it is preferable that orthogonal transmittance measured by preparing two polarizers and by superimposing the two polarizers such that absorption axes of the two polarizers mutually form 90° is smaller, in practical use, the orthogonal transmittance is preferably greater than or equal to 0.00% and less than or equal to 0.050%, and is more preferably less than or equal to 0.030%. The polarization degree, in practical use, is preferably greater than or equal to 99.90% and less than or equal to 100%, and is particularly preferably greater than or equal to 99.93% and less than or equal to 100%. A polarizer in which approximately the same optical properties are able to be obtained even at the time of being measured as a polarizing plate is preferable.

(Retardation Film)

The backlight side polarizing plate may include the retardation film as the inner side polarizing plate protective film on the liquid crystal cell side.

Re(535) of the retardation film described above is preferably 20 nm to 90 nm, is more preferably 30 nm to 80 nm, and is particularly preferably 40 nm to 70 nm.

Retardation Rth(535) of the retardation film described above in a film thickness direction is preferably 80 nm to 170 nm, is more preferably 90 nm to 160 nm, and is particularly preferably 100 nm to 150 nm.

In the measurement of Re and Rth of the retardation film, when a thermoplastic resin used in a substrate of the retardation film is cellulose ester, retardation measurement is performed by setting the average refractive index of the retardation film to 1.48.

Re and Rth described above are able to be adjusted by the type of thermoplastic resin used in the retardation film described above (when the thermoplastic resin used in the retardation film, for example, is cellulose ester, the degree of substitution of the cellulose ester), the amount of thermoplastic resin and additive, addition of a retardation increasing agent, the film thickness of the film, a stretching direction and a stretching ratio of the film, and the like.

Preferred aspects of the additive used in the retardation film are identical to preferred aspects of a sugar ester compound, an additive having negative intrinsic birefringence, a nitrogen-containing aromatic compound-based plasticizer, fine particles, and a retardation increasing agent disclosed in JP2012-068661A, and the contents of the publication are incorporated in the present invention.

Preferred aspects of a manufacturing method of the retardation film are identical to preferred aspects of a manufacturing method of a cellulose acylate film disclosed in JP2012-068661A, and the contents of the publication are incorporated in the present invention.

(Adhesive Layer)

In order to bond the polarizer to substrate of the polarizing plate protective film or the retardation film, an adhesive agent, an adhesion agent, and the like are able to be suitably adopted according to the polarizer, and the polarizing plate protective film or the retardation film. This adhesive agent and an adhesion treatment method are not particularly limited, and for example, the adhesion treatment method is able to be performed through an adhesive agent formed of a vinyl polymer, an adhesive agent formed of a water-soluble cross-linking agent of a vinyl alcohol-based polymer such as at least a boric acid or borax, glutaraldehyde or melamine, and an oxalic acid. The adhesive layer formed of such an adhesive agent is able to be formed as a coated and dried layer of an aqueous solution, and when this aqueous solution is prepared, as necessary, a cross-linking agent or other additives, and a catalyst such as an acid are able to be mixed. In particular, when a polyvinyl alcohol-based polymer film is used as the polarizer, it is preferable that an adhesive agent containing a polyvinyl alcohol-based resin is used from a viewpoint of preferred adhesiveness. Further, it is more preferable that an adhesive agent containing a polyvinyl alcohol-based resin having an acetoacetyl group is used from a viewpoint of improving durability.

The polyvinyl alcohol-based resin is not particularly limited, but the average degree of polymerization is approximately 100 to 3000, and the average degree of saponification is preferably 85 mol % to 100 mol %, from a viewpoint of adhesiveness. In addition, the concentration of the adhesive agent aqueous solution is not particularly limited, but the concentration of the adhesive agent aqueous solution is preferably 0.1 mass % to 15 mass %, and is more preferably 0.5 mass % to 10 mass %. The thickness of the adhesive layer is preferably approximately 30 nm to 1000 nm, and is more preferably 50 nm to 300 nm, in the thickness after drying. When the thickness is excessively thin, an adhesion force becomes insufficient, and when the thickness is excessively thick, a problem is more likely to occur in the appearance.

An ultraviolet curable resin or a thermosetting resin such as a (meth)acrylic resin, an urethane-based resin, an acryl urethane-based resin, an epoxy-based resin, and a silicone-based resin is able to be used as the other adhesive agent.

<Display Side Polarizing Plate>

It is preferable that the display side polarizing plate included in the liquid crystal display device of the present invention includes the polarizer.

It is preferable that the display side polarizing plate includes the outer side polarizing plate protective film on the surface of the polarizer on a side separated from the liquid crystal cell.

The display side polarizing plate may include the inner side polarizing plate protective film on a side of the polarizer close to the liquid crystal cell.

Preferred aspects of the polarizer included in the display side polarizing plate are identical to the preferred aspects of the backlight side polarizer.

A thermoplastic resin having excellent transparency, mechanical strength, heat stability, moisture blocking properties, isotropy, and the like is used as the polarizing plate protective film of the display side polarizing plate. Specific examples of the thermoplastic resin are able to include the thermoplastic resins which are described in the substrate of the backlight side polarizing plate protective film of the backlight side polarizing plate described above. Among them, the cellulose resin is preferable, and the triacetyl cellulose is particularly preferable. Various products of the triacetyl cellulose have been commercially available, and the triacetyl cellulose is advantageous from a viewpoint of easiness in acquisition and cost.

Examples of a commercially available product of the triacetyl cellulose include product names of "UV-50", "UV-80", "SH-80", "TD-80U", "TD-TAC", "UZ-TAC", and "TD60UL" manufactured by Fujifilm Corporation, and a product name of "KC Series" manufactured by Konica Minolta, Inc., and the like.

In the polarizing plate protective film of the display side polarizing plate, the polarizing plate protective film on the liquid crystal cell side may be the retardation film.

<Liquid Crystal Cell>

The configuration of the liquid crystal cell is not particularly limited, but a liquid crystal cell having a general configuration is able to be adopted. The liquid crystal cell, for example, includes a pair of substrates which are arranged to face each other, and a liquid crystal layer interposed between the pair of substrates, and as necessary, may include a color filter layer and the like. The driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode are able to be used.

It is preferable that the liquid crystal cell used in the liquid crystal display device of the present invention is in a VA mode, an OCB mode, an IPS mode, or a TN mode, but the present invention is not limited thereto.

In the liquid crystal cell of the TN mode, rod-like liquid crystal molecules are substantially horizontally aligned at the time of not applying a voltage, and are twistedly aligned by 60° to 120°. The liquid crystal cell of the TN mode is mostly used as a color TFT liquid crystal display device, and is disclosed in a plurality of literatures.

In the liquid crystal cell of the VA mode, the rod-like liquid crystal molecules are substantially vertically aligned at the time of not applying a voltage. The liquid crystal cell of the VA mode includes (1) a liquid crystal cell of a VA mode in the narrow sense in which rod-like liquid crystal molecules are substantially vertically aligned at the time of not applying a voltage, and are substantially horizontally aligned at the time of applying a voltage (disclosed in JP1990-176625A (JP-H02-176625A)), (2) a liquid crystal cell for widening a view angle in which a VA mode is a multidomain (an MVA mode) (disclosed in SID97, Digest of tech. Papers (Proceedings) 28 (1997) 845), (3) a liquid crystal cell of a mode (an n-ASM mode) in which rod-like liquid crystal molecules are substantially vertically aligned at the time of not applying a voltage, and are twistedly multidomain-aligned at the time of applying a voltage (disclosed in Proceedings of Japan Liquid Crystal Conference 58 to 59 (1998)), and (4) a liquid crystal cell of a SURVIVAL mode (published in LCD International 98). In addition, the liquid crystal cell may be any one of a patterned vertical alignment (PVA) type liquid crystal cell, an optical alignment type liquid crystal cell, and a polymer-sustained alignment (PSA) liquid crystal cell. The details of these modes are specifically disclosed in JP2006-215326A and JP2008-538819A.

In the liquid crystal cell of the IPS mode, the rod-like liquid crystal molecules are aligned to be substantially parallel to the substrate, and an electric field which is parallel to the surface of the substrate is applied, and thus the liquid crystal molecule planarly responds. In the IPS mode, black display is performed in a state of not applying an electric field, and the absorption axes of a pair of upper and lower polarizing plates are orthogonal to each other. Methods in which leaked light in the inclined direction at the time of the black display is reduced by using the optical compensation sheet, and thus a view angle is improved are disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

It is preferable that an embodiment of the liquid crystal display device includes a liquid crystal cell in which a liquid crystal layer is interposed between facing substrates of which at least one includes an electrode, and the liquid crystal cell is configured by being arranged between two polarizing plates. The liquid crystal display device includes the liquid crystal cell in which a liquid crystal is sealed between upper and lower substrates, changes the alignment state of the liquid crystal by applying a voltage, and thus displays an image. Further, as necessary, the liquid crystal display device includes an associated functional layer such as a polarizing plate protective film or an optical compensation member performing optical compensation, and an adhesive layer. In addition, the image display device of the present invention may include other members. For example, a surface layer such as a forward scattering layer, a primer layer, an antistatic layer, and an undercoat layer may be arranged along with (or instead of) a color filter substrate, a thin layer transistor substrate, a lens film, a diffusion sheet, a hard coat layer, an anti-reflection layer, a low reflection layer, an antiglare layer, and the like.

<Other Configurations>

(Color Filter)

When the light source uses blue light of less than or equal to 500 nm, a pixel in the present invention is able to be formed by using various known methods as a method of forming an RGB pixel. For example, a photomask is able to be formed on a glass substrate, a desired black matrix is able to be formed thereon by using the photoresist, and a pixel pattern of R, G, B is able to be formed thereon, and an ink composition is discharged by using a printing device of an ink jet method until a desired concentration is obtained in a region (a concave portion surrounded by a convex portion) which is partitioned by a black matrix having a predetermined width and a black matrix having a width wider than that of the black matrix described above at every n black matrices by using a coloring ink for a pixel of R, G and B, and thus a color filter formed of the pattern of R, G, and B is able to be prepared. After image coloring, each pixel and the black matrix may be completely cured by baking or the like.

Preferred properties of the color filter are disclosed in JP2008-083611A and the like, and the contents of the publications are incorporated in the present invention.

For example, it is preferable that one wavelength at which the transmittance is half of the maximum transmittance in a color filter exhibiting a green color is greater than or equal to 590 nm and less than or equal to 610 nm, and the other is greater than or equal to 470 nm and less than or equal to 500 nm. In addition, it is preferable that one wavelength at which the transmittance is half of the maximum transmittance described above in the color filter exhibiting a green color is greater than or equal to 590 nm and less than or equal to 600 nm. Further, it is preferable that the maximum transmittance of the color filter exhibiting a green color is greater than or equal to 80%. It is preferable that a wavelength at which the transmittance is the maximum transmittance in the color filter exhibiting a green color is greater than or equal to 530 nm and less than or equal to 560 nm.

In the color filter exhibiting the green color, it is preferable that the transmittance at the wavelength of the light emitting peak is less than or equal to 10% of the maximum transmittance.

In the color filter exhibiting the red color, it is preferable that the transmittance at a wavelength of greater than or equal to 580 nm and less than or equal to 590 nm is less than or equal to 10% of the maximum transmittance.

As the pigment for a color filter, in a blue color, a complementary pigment C.I. Pigment Violet 23 is used in C.I. Pigment Blue 15:6. In a red color, C.I. Pigment Yellow 139 is used in C.I. Pigment Red 254 as a complementary color pigment. As the pigment for a green color, in general, C.I. Pigment Yellow 150, C.I. Pigment Yellow 138, and the like are used in C.I. Pigment Green 36 (copper bromide phthalocyanine green) and C.I. Pigment Green 7 (copper chloride phthalocyanine green) as a pigment for a complementary color. These pigments are able to be controlled by adjusting the composition of the pigment. The composition of the complementary pigment is increased by a small amount with respect to a comparative example, and thus it is possible to set a half-value wavelength on the long wavelength side to be in a range of 590 nm to 600 nm. Furthermore, currently, the pigment is generally used, but a color filter of a dye may be used insofar as the pigment is able to control a spectrum and to ensure process stability and reliability.

(Black Matrix)

In the liquid crystal display device of the present invention, it is preferable that the black matrix is arranged between the respective pixels. Examples of a material forming a black matrix include a material using a sputtered film of metal such as chromium, a light shielding photosensitive composition in which a photosensitive resin, a black coloring agent, and the like are combined, and the like. Specific examples of the black coloring agent include carbon black, titanium carbon, iron oxide, titanium oxide, graphite, and the like, and among them, the carbon black is preferable.

(Thin Layer Transistor)

It is preferable that the liquid crystal display device of the present invention further includes a TFT substrate including a thin layer transistor (hereinafter, also referred to as a TFT).

It is preferable that the thin layer transistor includes an oxide semiconductor layer having a carrier concentration of less than $1 \times 10^{14}/cm^3$. Preferred aspects of the thin layer transistor described above are disclosed in JP2011-141522A, and the contents of the publication are incorporated in the present invention.

EXAMPLES

Hereinafter, the characteristics of the present invention will be more specifically described with reference to examples and comparative examples. Materials, used amounts, ratios, treatment contents, treatment sequences, and the like of the following examples are able to be suitably changed unless the changes cause deviance from the gist of the present invention. Therefore, the range of the present invention will not be restrictively interpreted by the following specific examples.

Example 1

<Preparation of Barrier Film>
(Preparation of Barrier Film 1)

A PET film (manufactured by TOYOBO CO., LTD., Cosmoshine A4300, a thickness of 100 μm, and a refractive index of 1.62) was used as a transparent substrate, and was arranged in a chamber of a magnetron sputtering device. Silicon nitride was used as a target, and an inorganic film was formed in the following film formation conditions such that a film thickness of silicon oxide nitride was 25 nm.

Film Formation Pressure: $2.5 \times 10^{-1}$ Pa
Argon Gas Flow Rate: 20 sccm
Nitrogen Gas Flow Rate: 9 sccm
Frequency: 13.56 MHz
Power: 1.2 kW A resin containing a Cardo polymer having fluorene as a skeleton was applied onto the inorganic film by a spin coating method, was heated at 160° C. For 1 hour, and thus an organic film was formed. The film thickness of the organic film was 1 μm. Thus, a barrier film 1 was obtained. Furthermore, the obtained barrier film 1 had barrier properties such as oxygen permeability of less than or equal to 0.5 $cm^3/m^2$/day/atm and water vapor permeability of less than or equal to 0.5 $g/m^2$/day. The oxygen permeability and the water vapor permeability of the barrier film 1 were shown in the following Table 1. Furthermore, these barrier properties are values measured by the method described herein.

(Preparation of Optical Thin Film)

An optical thin film was prepared on the surface of a transparent substrate of the barrier film 1 on which the inorganic film and the organic film were not applied by the following method.

A composition for forming an optical thin film which included the resin containing the Cardo polymer having fluorene as a skeleton was applied onto the surface of the transparent substrate of the barrier film 1 on which the inorganic film and the organic film were not applied by a spin coating method, was heated at 160° C. for 1 hour, and thus the optical thin film was prepared.

The barrier film attached with the optical thin film obtained as described above was set to a barrier film of Example 1.

In the barrier film of Example 1, a film thickness d of the optical thin film, a refractive index n(535) of the optical thin film, a product of n(535)*d of the refractive index and the film thickness of the optical thin film, and the type and a refractive index nu(535) of a layer adjacent to the optical thin film were shown in the following Table 1.

Furthermore, in the barrier film of Example 1, the layer adjacent to the optical thin film is the transparent substrate of the barrier film 1.

(Preparation of Light Conversion Member)

A quantum dot sheet 1 performing fluorescent emission of green light having a peak wavelength of 535 nm and a full width at half maximum of 40 nm and red light having a full width at half maximum of 630 nm and a full width at half maximum of 30 nm when blue light of a blue emission diode was incident was formed as a light conversion layer containing a fluorescent material of a light conversion member with reference to JP2012-169271A.

Two barrier films of Example 1 which were the barrier film attached with the optical thin film manufactured in Example 1 described above were bonded to the obtained quantum dot sheet 1 by using an acrylic adhesive agent having a refractive index of 1.47 such that the optical thin film was arranged on an air interface side and the quantum dot sheet 1 was interposed from both of the sides.

The light conversion member obtained as described above in which the barrier film of Example 1 was laminated on both surfaces of the light conversion layer containing the fluorescent material was set to a light conversion member of Example 1.

<Manufacturing of Backlight Unit>

A triple-wavelength BLK (an RGB narrowband backlight unit) including a blue emission diode (B-LED, manufactured by Nichia Corporation, a main wavelength of 465 nm, and a full width at half maximum of 20 nm) as an edge light source arranged on a side surface of a light guide plate, and the light conversion member of Example 1 on a visible side of the light guide plate was manufactured.

The obtained backlight unit was set to a backlight unit of Example 1.

<Manufacturing of Liquid Crystal Display Device>

A commercially available liquid crystal display device (manufactured by Panasonic Corporation, a product name of TH-A2D2) was disassembled, a backlight unit including a light conversion member was changed to the backlight unit of Example 1, and then was reassembled to be identical to the state before being disassembled, and thus a liquid crystal display device of Example 1 was manufactured.

Examples 2 to 9 and Comparative Examples 4 to 7

In the manufacturing of the barrier film of Example 1, barrier films of Examples 2 to 9 and Comparative Examples 4 to 7 were manufactured by the same method as that in Example 1 except that the thickness d of the optical thin film laminated on the barrier film 1 was changed as in the following Table 1.

After that, light conversion members, backlight units, and liquid crystal display devices of Examples 2 to 9 and Comparative Examples 4 to 7 were manufactured by the same method as that in Example 1 except that the barrier films of Examples 2 to 9 and Comparative Examples 4 to 7 were used instead of the barrier film of Example 1.

Example 10

(Synthesis of Perfluoroolefin Copolymer P-1)

A perfluoroolefin copolymer P-1 having the following structure was prepared by the same method as that of a perfluoroolefin copolymer (1) disclosed in "0271" to "0274" of JP2010-152311A. The refractive index of the obtained perfluoroolefin copolymer P-1 was 1.422.

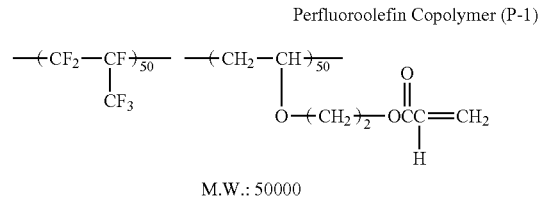

Perfluoroolefin Copolymer (P-1)

M.W.: 50000

In the structural formula described above, a molar ratio of 50:50 is indicated.

(Preparation of Hollow Silica Dispersion Liquid A-1)

A hollow silica particle dispersion liquid A-1 (a concentration of solid contents of 18.2 mass %) having an average particle diameter of 60 nm, a shell thickness of 10 nm, and a refractive index of silica particles of 1.31 was prepared by adjusting the conditions using the same method as that of a dispersion liquid (A-1) disclosed in "0394" of JP2007-298974A.

(Preparation of Composition for Forming Optical Thin Film A-1)

The following composition was put into a mixing tank and was stirred, and thus a composition for forming an optical thin film A-1 (a concentration of solid contents of 5 mass %) was obtained.

| | |
|---|---|
| Perfluoroolefin Copolymer P-1 | 14.8 parts by mass |
| Ethyl Methyl Ketone | 157.7 parts by mass |
| DPHA | 3.0 parts by mass |
| Hollow Silica Particle Dispersion Liquid A-1 | 21.2 parts by mass |
| Irgacure 127 | 1.3 parts by mass |
| X22-164C | 2.1 parts by mass |

In the manufacturing of the barrier film of Example 1, a barrier film of Example 10 was manufactured by the same method as that in Example 1 except that an optical thin film was formed by applying the composition for forming an optical thin film A-1 described above instead of applying the composition for forming an optical thin film onto the surface of the transparent substrate of the barrier film 1 on which the inorganic film and the organic film were not applied, and the film thickness of the optical thin film was changed to 0.85 μm.

After that, a light conversion member, a backlight unit, and a liquid crystal display device of Example 10 were manufactured by the same method as that in Example 10 except that the barrier film of Example 10 was used instead of the barrier film of Example 1.

Comparative Example 1

A commercially available liquid crystal display device (manufactured by Panasonic Corporation, a product name of TH-L42D2) was disassembled, and a backlight unit including a light conversion member was taken out.

In manufacturing of the light conversion member of Example 1, a light conversion member of Comparative Example 1 was manufactured by the same method as that in Example 1 except that a light conversion layer embedded in a commercially available liquid crystal display device (manufactured by Panasonic Corporation, a product name of TH-L42D2) was used by being disassembled as the light conversion layer containing the fluorescent material of the light conversion member, and the barrier film 1 before laminating the optical thin film was used instead of the barrier film of Example 1. Furthermore, bonding was performed by using an acrylic adhesive agent having a refractive index of 1.47 such that the transparent substrate of the barrier film 1 which was a laminated body of the sequence of the transparent substrate/the inorganic layer/the organic layer was arranged on the air interface side, and the light conversion layer containing the fluorescent material of the light conversion member embedded in the commercially available liquid crystal display device was interposed from both of the sides.

In manufacturing of the backlight unit of Example 1, a backlight unit of Comparative Example 1 was manufactured by the same method as that in Example 1 except that the light conversion member of Comparative Example 1 was used instead of the light conversion member of Example 1.

Furthermore, a light source of the backlight unit embedded in the liquid crystal display device used in the following Comparative Example 1 or Comparative Examples 2, 3, 8, 11 to 13, and 18 was blue light having an emission peak wavelength of 450 nm. Light emitted from the light conversion layer containing the fluorescent material of the light conversion member embedded in the backlight unit of the liquid crystal display device used in Comparative Example 1 had one emission peak in a green to red region, a peak wavelength of 550 nm, and a full width at half maximum of 100 nm. That is, the obtained backlight unit of the following Comparative Example 1 or Comparative Examples 2, 3, and 8 was a so-called (pseudo) white LED.

In the disassembled commercially available liquid crystal display device, the commercially available liquid crystal display device was reassembled to be identical to the state before being disassembled by using the backlight unit of Comparative Example 1 instead of the embedded backlight unit including the light conversion member, and thus a liquid crystal display device of Comparative Example 1 was manufactured.

Comparative Examples 2, 3, and 8

A commercially available liquid crystal display device (manufactured by Panasonic Corporation, a product name of TH-L42D2) was disassembled, and thus a backlight unit including a light conversion member was taken out.

In the manufacturing of the light conversion member of Example 1, light conversion members of Comparative Examples 2, 3, and 8 were manufactured by the same method as that in Example 1 except that a light conversion layer embedded in a commercially available liquid crystal display device (manufactured by Panasonic Corporation, a product name of TH-L42D2) was used by being disassembled as the light conversion layer containing the fluorescent material of the light conversion member, and the barrier films of Examples 2, 5, and 8 were respectively used instead of the barrier film of Example 1.

In manufacturing of the backlight unit of Example 1, backlight units of Comparative Examples 2, 3, and 8 were manufactured by the same method as that in Example 1 except that the light conversion members of Comparative Examples 2, 3, and 8 were used instead of the light conversion member of Example 1.

In the disassembled commercially available liquid crystal display device, the commercially available liquid crystal display device was reassembled to be identical to the state before being disassembled by using the backlight units of Comparative Examples 2, 3, and 8 instead of the embedded backlight unit including the light conversion member, and thus liquid crystal display devices of Comparative Examples 2, 3, and 8 were manufactured.

Examples 2A, 5A, and 8A (Preparation of Barrier Films 2 to 4)

Barrier films 2 to 4 were prepared by only changing the thickness of the organic film in the preparation of the barrier film 1. The thicknesses of the organic films of the barrier films 2 to 4 were respectively 0.83 µm, 1.02 µm, and 1.20 µm. The obtained barrier films 2 to 4 were respectively set to barrier films of Examples 2A, 5A, and 8A. Furthermore, in the barrier films of Example 2A, 5A, and 8A, the layer adjacent to the optical thin film is an inorganic film of the barrier films 2 to 4. Oxygen permeability and water vapor permeability of the barrier films 2 to 4 were shown in the following Table 1.

In the manufacturing of the light conversion member of Example 1, light conversion members of Examples 2A, 5A, and 8A were manufactured by the same method as that in Example 1 except that the barrier films of Examples 2A, 5A, and 8A were respectively used instead of the barrier film of Example 1 such that the surface of the transparent substrate on which the inorganic film and the organic film were applied was arranged on the air interface side, and the surface of the transparent substrate on which any film was not applied interposed the quantum dot sheet 1 from both of the sides. In this case, a structure is obtained in which the organic film also functions as the optical thin film.

In the manufacturing of the backlight unit of Example 1, backlight units of Examples 2A, 5A, and 8A were manufactured by the same method as that in Example 1 except that light conversion members of Examples 2A, 5A, and 8A were used instead of the light conversion member of Example 1.

In the disassembled commercially available liquid crystal display device, the commercially available liquid crystal display device was reassembled to be identical to the state before being disassembled by using the backlight units of Examples 2A, 5A, and 8A instead of the embedded backlight unit including the light conversion member, and thus liquid crystal display devices of Examples 2A, 5A, and 8A were manufactured.

Example 10A (Preparation of Barrier Film 5)

In the preparation of barrier film 1, a barrier film 5 was prepared by the same preparation method as that of the barrier film 1 except that a composition for forming an organic film adjacent to the inorganic film was changed to the composition for forming an optical thin film A-1 described above, the film thickness of the organic film was 1.32 µm, and the organic film was not disposed on the surface of the transparent substrate on which the inorganic film and the organic film were not applied. In the barrier film 5, the layer adjacent to the optical thin film was an inorganic film of the barrier film 5. Oxygen permeability and water vapor permeability of the barrier film 5 were shown in the following Table 1.

In the manufacturing of the light conversion member of Example 10, a light conversion member of Example 10A was manufactured by the same method as that in Example 10 except that the barrier film 5 described above was used instead of the barrier film of Example 10 such that the surface of the transparent substrate on which the inorganic film and the organic film were applied was arranged on the air interface side, and the surface of the transparent substrate on which any film was not applied interposed the quantum dot sheet 1 from both of the sides. In this case, a structure is obtained in which the organic film also functions as the optical thin film. That is, in the light conversion member of Example 10A, the thickness of the optical thin film is 1.32 µm.

In the manufacturing of the backlight unit of Example 10, a backlight unit of Example 10A was manufactured by the same method as that in Example 10 except that the light conversion member of Example 10A was used instead of the light conversion member of Example 10.

In the disassembled commercially available liquid crystal display device, the commercially available liquid crystal display device was reassembled to be identical to the state before being disassembled by using backlight unit of Example 10A instead of the embedded backlight unit including the light conversion member, and thus a liquid crystal display device of Example 10A was manufactured.

Comparative Example 9

In the manufacturing of the light conversion member of Example 1, a light conversion member of Comparative Example 9 was manufactured by the same method as that in Example 1 except that the barrier film 1 before laminating the optical thin film was used instead of the barrier film of Example 1. Furthermore, bonding was performed by using an acrylic adhesive agent having a refractive index of 1.47 such that the transparent substrate of the barrier film 1 which was a laminated body of the sequence of the transparent substrate/the inorganic layer/the organic layer was arranged on the air interface side, and the quantum dot sheet 1 was interposed from both of the sides.

After that, a backlight unit and a liquid crystal display device of Comparative Example 9 were manufactured by the same method as that in Example 1 except that the light conversion member of Comparative Example 9 was used instead of the light conversion member of Example 1.

[Evaluation]

The liquid crystal display devices of Examples 1 to 10, 2A, 5A, 8A, and 10A and Comparative Examples 1 to 9 were evaluated on the basis of the following criteria.

(1) Wavelength Dependency of Transmittance of Optical Thin Film and Layer Directly Adjacent to Optical Thin Film The transmittance of the laminated body (hereinafter, also referred to as a sample film) of optical thin film and the layer directly adjacent to the optical thin film included in the liquid crystal display device of each of the examples and comparative examples was measured by using a spectrophotometer V-550 (manufactured by JASCO CORPORATION) in a wavelength region of visible light of 380 nm to 780 nm. However, in this measurement, the transmittance on the air interface side of the sample film, that is, on the optical thin film side, was intended to be measured, and thus two sample films were prepared, the surfaces of the sample films on a side opposite to the optical thin film adhered to each other through refractive index matching oil, the transmittance was measured by setting both surfaces to be on the optical thin film side, and the transmittance was converted into transmittance of only one optical thin film from the measured value (taking the square root of the total value) and was set to sample film transmittance.

The results of the sample film transmittance in five wavelengths shown in the following Table 1 are shown in the following Table 1.

(2) Evaluation of Liquid Crystal Display Device

The transmittance of the liquid crystal display device of each of the examples and comparative examples was measured. The transmittance was measured by using a spectrophotometer V-550 (manufactured by JASCO CORPORATION) in the total visible light wavelength. The transmittance was transmittance at a Y value in an XYZ color system.

In the obtained transmittance, an increment in the transmittance of the liquid crystal display device of each of the examples and comparative examples except for Comparative Example 1 was calculated by the following expression on the basis of the transmittance of the liquid crystal display device of Comparative Example 1.

Expression:

(Increment in Transmittance of Liquid Crystal Display Device of Each of Examples and Comparative Examples Except for Comparative Example 1)=100%×{(Transmittance of Liquid Crystal Display Device of Each of Examples and Comparative Examples Except for Comparative Example 1)−(Transmittance of Liquid Crystal Display Device of Comparative Example 1)}/(Transmittance of Liquid Crystal Display Device of Comparative Example 1)

In addition, a color reproducing region of the liquid crystal display device was measured by using a method disclosed in "0066" of JP2012-3073A. It is practically required that a color reproduction region NTSC ratio is greater than or equal to 72%, and the color reproduction region NTSC ratio is preferably greater than 72%, and is more preferably 100%.

The results are shown in the following Table 1.

TABLE 1

| | Backlight Unit | | | | | | | | | | | | | | LCD Performance | |
|---|---|---|---|---|---|---|---|---|---|---|---|---|---|---|---|---|
| | Barrier Film | | | | | | | | | | Light Conversion Layer | | | | Increment in Transmittance of Liquid Crystal Display Device (Based on Comparative Example 1) | Color Reproduction Region NTSC Ratio [%] |
| | Optical Thin Film | | | Layer Adjacent to Optical Thin Film | Refractive Index nu (535) | Wavelength Dependency of Transmittance Only of Barrier Film | | | | | Oxygen Permeability [cm³/m²·day/atm] | Water Vapor Permeability [g/m²/day] | Containing Fluorescent Member | Barrier Film of Light Conversion Member | | |
| | Refractive Index n (535) | Thickness d (μm) | n (535) × d | Type | | 450 nm | 493 nm | 535 nm | 583 nm | 630 nm | | | | | Type | |
| Comparative Example 1 | None | None | None | None | | | | | | | | | Commercial Product Embedded | Barrier Film 1 | White LED | 0% | 72% |
| Comparative Example 2 | | | | | Same as Example 2 | | | | | | | | Commercial Product Embedded | Example 2 | White LED | 0% | 72% |
| Comparative Example 3 | | | | | Same as Example 5 | | | | | | | | Commercial Product Embedded | Example 5 | White LED | 0% | 72% |
| Comparative Example 8 | | | | | Same as Example 8 | | | | | | | | Commercial Product Embedded | Example 8 | White LED | 0% | 72% |
| Example 1 | 1.45 | 0.79 | 1.15 | Transparent Substrate of Barrier Film 1 | 1.62 | 0.97 | 0.96 | 0.97 | 0.96 | 0.97 | Less than or Equal to 0.5 | Less than or Equal to 0.5 | Quantum Dot Sheet 1 | Example 1 | Triple-Wavelength BKL | 4% | 100% |
| Example 2 | 1.45 | 0.83 | 1.20 | Transparent Substrate of Barrier Film 1 | 1.62 | 0.97 | 0.96 | 0.98 | 0.96 | 0.97 | Less than or Equal to 0.5 | Less than or Equal to 0.5 | Quantum Dot Sheet 1 | Example 2 | Triple-Wavelength BKL | 4% | 100% |
| Example 3 | 1.45 | 0.86 | 1.25 | Transparent Substrate of Barrier Film 1 | 1.62 | 0.97 | 0.96 | 0.97 | 0.96 | 0.97 | Less than or Equal to 0.5 | Less than or Equal to 0.5 | Quantum Dot Sheet 1 | Example 3 | Triple-Wavelength BKL | 4% | 100% |
| Example 4 | 1.45 | 1.00 | 1.45 | Transparent Substrate of Barrier Film 1 | 1.62 | 0.97 | 0.96 | 0.97 | 0.96 | 0.97 | Less than or Equal to 0.5 | Less than or Equal to 0.5 | Quantum Dot Sheet 1 | Example 4 | Triple-Wavelength BKL | 4% | 100% |
| Example 5 | 1.45 | 1.02 | 1.49 | Transparent Substrate of Barrier Film 1 | 1.62 | 0.98 | 0.96 | 0.98 | 0.96 | 0.98 | Less than or Equal to 0.5 | Less than or Equal to 0.5 | Quantum Dot Sheet 1 | Example 5 | Triple-Wavelength BKL | 4% | 100% |
| Example 6 | 1.45 | 1.05 | 1.52 | Transparent Substrate of Barrier Film 1 | 1.62 | 0.97 | 0.96 | 0.97 | 0.96 | 0.97 | Less than or Equal to 0.5 | Less than or Equal to 0.5 | Quantum Dot Sheet 1 | Example 6 | Triple-Wavelength BKL | 4% | 100% |
| Example 7 | 1.45 | 1.17 | 1.69 | Transparent Substrate of Barrier Film 1 | 1.62 | 0.97 | 0.96 | 0.97 | 0.96 | 0.97 | Less than or Equal to 0.5 | Less than or Equal to 0.5 | Quantum Dot Sheet 1 | Example 7 | Triple-Wavelength BKL | 4% | 100% |
| Example 8 | 1.45 | 1.20 | 1.74 | Transparent Substrate of Barrier Film 1 | 1.62 | 0.97 | 0.96 | 0.98 | 0.96 | 0.97 | Less than or Equal to 0.5 | Less than or Equal to 0.5 | Quantum Dot Sheet 1 | Example 8 | Triple-Wavelength BKL | 4% | 100% |

TABLE 1-continued

| | Backlight Unit | | | | | | | | | | | | | | LCD Performance | |
|---|---|---|---|---|---|---|---|---|---|---|---|---|---|---|---|---|
| | Barrier Film | | | | | | | | | Light Conversion Layer | | | | Increment in Transmittance of Liquid Crystal Display Device (Based on Comparative Example 1) | Color Reproduction Region NTSC Ratio [%] |
| | Optical Thin Film | | | Layer Adjacent to Optical Thin Film | | Wavelength Dependency of Transmittance Only of Barrier Film | | | | Oxygen Permeability [cm³/m²·day/atm] | Water Vapor Permeability [g/m²/day] | Containing Fluorescent Member | Barrier Film of Light Conversion Member | | |
| | Refractive Index n (535) | Thickness d (μm) | n (535) × d | Type | Refractive Index nu (535) | 450 nm | 493 nm | 535 nm | 583 nm | 630 nm | | | | | | |
| Example 9 | 1.45 | 1.23 | 1.79 | Transparent Substrate of Barrier Film 1 | 1.62 | 0.97 | 0.96 | 0.97 | 0.96 | 0.97 | Less than or Equal to 0.5 | Less than or Equal to 0.5 | Quantum Dot Sheet 1 | Example 9 | Triple-Wavelength BKL | 4% | 100% |
| Comparative Example 4 | 1.45 | 0.76 | 1.10 | Transparent Substrate of Barrier Film 1 | 1.62 | 0.96 | 0.97 | 0.96 | 0.97 | 0.96 | Less than or Equal to 0.5 | Less than or Equal to 0.5 | Quantum Dot Sheet 1 | Comparative Example 4 | Triple-Wavelength BKL | 0% | 100% |
| Comparative Example 5 | 1.45 | 0.93 | 1.35 | Transparent Substrate of Barrier Film 1 | 1.62 | 0.96 | 0.98 | 0.96 | 0.98 | 0.96 | Less than or Equal to 0.5 | Less than or Equal to 0.5 | Quantum Dot Sheet 1 | Comparative Example 5 | Triple-Wavelength BKL | 0% | 100% |
| Comparative Example 6 | 1.45 | 1.11 | 1.61 | Transparent Substrate of Barrier Film 1 | 1.62 | 0.96 | 0.98 | 0.96 | 0.98 | 0.96 | Less than or Equal to 0.5 | Less than or Equal to 0.5 | Quantum Dot Sheet 1 | Comparative Example 6 | Triple-Wavelength BKL | 0% | 100% |
| Comparative Example 7 | 1.45 | 1.27 | 1.84 | Transparent Substrate of Barrier Film 1 | 1.62 | 0.96 | 0.97 | 0.96 | 0.97 | 0.96 | Less than or Equal to 0.5 | Less than or Equal to 0.5 | Quantum Dot Sheet 1 | Comparative Example 7 | Triple-Wavelength BKL | 0% | 100% |
| Example 2A | 1.45 | 0.83 | 1.20 | Inorganic Film of Barrier Film 2 | 1.8 | 0.97 | 0.96 | 0.98 | 0.96 | 0.97 | Less than or Equal to 0.1 | Less than or Equal to 0.1 | Quantum Dot Sheet 1 | Example 2A | Triple-Wavelength BKL | 4% | 100% |
| Example 5A | 1.45 | 1.02 | 1.49 | Inorganic Film of Barrier Film 3 | 1.8 | 0.97 | 0.96 | 0.98 | 0.96 | 0.97 | Less than or Equal to 0.1 | Less than or Equal to 0.1 | Quantum Dot Sheet 1 | Example 5A | Triple-Wavelength BKL | 4% | 100% |
| Example 8A | 1.45 | 1.20 | 1.74 | Inorganic Film of Barrier Film 4 | 1.8 | 0.97 | 0.96 | 0.98 | 0.96 | 0.97 | Less than or Equal to 0.1 | Less than or Equal to 0.1 | Quantum Dot Sheet 1 | Example 8A | Triple-Wavelength BKL | 4% | 100% |
| Comparative Example 9 | None | None | None | Transparent Substrate of Barrier Film 1 | 1.62 | 0.96 | 0.96 | 0.96 | 0.96 | 0.96 | Less than or Equal to 0.5 | Less than or Equal to 0.5 | Quantum Dot Sheet 1 | Barrier Film 1 | Triple-Wavelength BKL | 0% | 100% |
| Example 10 | 1.36 | 0.85 | 1.15 | Transparent Substrate of Barrier Film 1 | 1.62 | 0.97 | 0.97 | 0.97 | 0.97 | 0.97 | Less than or Equal to 0.5 | Less than or Equal to 0.5 | Quantum Dot Sheet 1 | Example 10 | Triple-Wavelength BKL | 5% | 100% |
| Example 10A | 1.36 | 1.32 | 1.79 | Inorganic Film of Barrier Film 5 | 1.8 | 0.97 | 0.97 | 0.98 | 0.97 | 0.97 | Less than or Equal to 0.1 | Less than or Equal to 0.1 | Quantum Dot Sheet 1 | Example 10A | Triple-Wavelength BKL | 5% | 100% |

According to Table 1 described above, it was found that the liquid crystal display device of the present invention had high light transmittance and a high color reproduction region.

In contrast, the liquid crystal display device of Comparative Example 1 in which the light conversion member did not include the optical thin film on the air interface had low light transmittance. It was found that the liquid crystal display devices of backlight unit Comparative Examples 2, 3, and 8 which were the white LEDs not having a peak in three wavelengths of RGB had low light transmittance. It was found that the liquid crystal display devices of Comparative Examples 4 to 7 in which the light conversion member included the optical thin film on the air interface but wavelength dependency of the transmittance of the optical thin film did not satisfy the range of the present invention had low light transmittance. It was found that the liquid crystal display device of Comparative Example 9 in which the light conversion member did not include the optical thin film on the air interface had low light transmittance.

Example 11

A backlight unit of a commercially available liquid crystal television KDL46W200A, manufactured by Sony Corporation was disassembled, and a QDOT wavelength conversion bar was taken out. The backlight unit of the liquid crystal television included a blue emission diode as an edge light source arranged on the side surface of a light guide plate, and the QDOT wavelength conversion bar described above performing fluorescent emission of green light having a center wavelength of 535 nm and a full width at half maximum of 40 nm and red light having a center wavelength of 630 nm and a full width at half maximum of 30 nm when blue light of the blue emission diode was incident was arranged between the edge light source and the light guide plate as the light conversion layer containing fluorescent material of the light conversion member.

Two barrier films of Example 1 which were barrier films attached with the optical thin film manufactured in Example 1 described above were bonded to the QDOT wavelength conversion bar by using an acrylic adhesive agent having a refractive index of 1.47 such that the optical thin film was arranged on the air interface side and the QDOT wavelength conversion bar was interposed from both of the sides. The obtained light conversion member was set to a light conversion member of Example 11. Furthermore, in the following Table 2, properties of the barrier film of Example 1 included in the light conversion member of Example 11 were shown.

After that, a backlight unit of Example 11 was manufactured by reassembling the light conversion member of Example 11 to be identical to the state before being disassembled instead of the QDOT wavelength conversion bar.

Further, in the disassembled commercially available liquid crystal display device, a liquid crystal display device of Example 11 was manufactured by using the backlight unit of Example 11 instead of the embedded backlight unit.

Examples 12 to 19 and Comparative Examples 14 to 17

In Example 11, light conversion members, backlight units, and liquid crystal display devices of Examples 12 to 19 and Comparative Examples 14 to 17 were manufactured by the same method as that in Example 11 except that a barrier film shown in the following Table 2 was used instead of the barrier film of Example 1.

Examples 12A, 15A, and 18A

In the manufacturing of the light conversion member of Example 11, light conversion members of Examples 12A, 15A, and 18A were manufactured by the same method as that in Example 11 except that the barrier films of Examples 2A, 5A, and 8A were respectively used instead of the barrier film of Example 1 such that the surface of the transparent substrate on which the inorganic film and the organic film were applied was arranged on the air interface side, and the surface of the transparent substrate on which any film was not applied interposed the QDOT wavelength conversion bar from both of the sides. In this case, a structure is obtained in which the organic film also functions as the optical thin film.

In the manufacturing of the backlight unit of Example 11, backlight units of Examples 12A, 15A, and 18A were manufactured by the same method as that in Example 11 except that light conversion members of Examples 12A, 15A, and 18A were used instead of the light conversion member of Example 11.

In the manufacturing of the liquid crystal display device of Example 11, liquid crystal display devices of Examples 12A, 15A, and 18A were manufactured by the same method as that in Example 11 except that the backlight units of Examples 12A, 15A, and 18A were used instead of the backlight unit of Example 11.

Comparative Example 19

In the manufacturing of the light conversion member of Example 11, a light conversion member of Comparative Example 19 was manufactured by the same method as that in Example 11 except that the barrier film 1 before laminating the optical thin film was used instead of the barrier film of Example 1. Furthermore, bonding was performed by using an acrylic adhesive agent having a refractive index of 1.47 such that the transparent substrate of the barrier film 1 which was a laminated body of the sequence of the transparent substrate/the inorganic layer/the organic layer was arranged on the air interface side, and the QDOT wavelength conversion bar was interposed from both of the sides.

After that, a backlight unit and a liquid crystal display device of Comparative Example 19 were manufactured by the same method as that in Example 11 except that the light conversion member of Comparative Example 19 was used instead of the light conversion member of Example 11.

[Evaluation]

The liquid crystal display devices of Examples 11 to 19, 12A, 15A, and 18A and Comparative Examples 14 to 17, and 19 were evaluated by the same criteria as those in Example 1. However, an increment in the transmittance of the liquid crystal display device was based on Comparative Example 19.

The results are shown in the following Table 2.

TABLE 2

| | Barrier Film | | | | | | | | | | | | | | Light Conversion Layer | Barrier Film of Light Conversion Member | LCD Performance | | |
|---|---|---|---|---|---|---|---|---|---|---|---|---|---|---|---|---|---|---|---|
| | Optical Thin Film | | | | Layer Adjacent to Optical Thin Film | | Wavelength Dependency of Transmittance Only of Barrier Film | | | | | Oxygen Permeability [cm³/m²/day/atm] | Water Vapor Permeability [g/m²/day] | Containing Fluorescent Material | | Type | Increment in Transmittance of Liquid Crystal Display Device (Based on Comparative Example 19) | Color Reproduction Region NTSC Ratio [%] |
| | Refractive Index n (535) | Thickness d (µm) | n (535) × d | Type | Refractive Index nu (535) | | 450 nm | 493 nm | 535 nm | 583 nm | 630 nm | | | | | | | |
| Example 11 | 1.45 | 0.79 | 1.15 | Transparent Substrate of Barrier Film 1 | 1.62 | | 0.97 | 0.96 | 0.97 | 0.96 | 0.97 | Less than or Equal to 0.5 | Less than or Equal to 0.5 | Commercial Product Embedded | Example 1 | Triple-Wavelength BKL | 4% | 100% |
| Example 12 | 1.45 | 0.83 | 1.20 | Transparent Substrate of Barrier Film 1 | 1.62 | | 0.97 | 0.96 | 0.98 | 0.96 | 0.97 | Less than or Equal to 0.5 | Less than or Equal to 0.5 | Commercial Product Embedded | Example 2 | Triple-Wavelength BKL | 4% | 100% |
| Example 13 | 1.45 | 0.86 | 1.25 | Transparent Substrate of Barrier Film 1 | 1.62 | | 0.97 | 0.96 | 0.97 | 0.96 | 0.97 | Less than or Equal to 0.5 | Less than or Equal to 0.5 | Commercial Product Embedded | Example 3 | Triple-Wavelength BKL | 4% | 100% |
| Example 14 | 1.45 | 1.00 | 1.45 | Transparent Substrate of Barrier Film 1 | 1.62 | | 0.97 | 0.96 | 0.97 | 0.96 | 0.97 | Less than or Equal to 0.5 | Less than or Equal to 0.5 | Commercial Product Embedded | Example 4 | Triple-Wavelength BKL | 4% | 100% |
| Example 15 | 1.45 | 1.02 | 1.49 | Transparent Substrate of Barrier Film 1 | 1.62 | | 0.98 | 0.96 | 0.98 | 0.96 | 0.98 | Less than or Equal to 0.5 | Less than or Equal to 0.5 | Commercial Product Embedded | Example 5 | Triple-Wavelength BKL | 4% | 100% |
| Example 16 | 1.45 | 1.05 | 1.52 | Transparent Substrate of Barrier Film 1 | 1.62 | | 0.97 | 0.96 | 0.97 | 0.96 | 0.97 | Less than or Equal to 0.5 | Less than or Equal to 0.5 | Commercial Product Embedded | Example 6 | Triple-Wavelength BKL | 4% | 100% |
| Example 17 | 1.45 | 1.17 | 1.69 | Transparent Substrate of Barrier Film 1 | 1.62 | | 0.97 | 0.96 | 0.97 | 0.96 | 0.97 | Less than or Equal to 0.5 | Less than or Equal to 0.5 | Commercial Product Embedded | Example 7 | Triple-Wavelength BKL | 4% | 100% |
| Example 18 | 1.45 | 1.20 | 1.74 | Transparent Substrate of Barrier Film 1 | 1.62 | | 0.97 | 0.96 | 0.98 | 0.96 | 0.97 | Less than or Equal to 0.5 | Less than or Equal to 0.5 | Commercial Product Embedded | Example 8 | Triple-Wavelength BKL | 4% | 100% |
| Example 19 | 1.45 | 1.23 | 1.79 | Transparent Substrate of Barrier Film 1 | 1.62 | | 0.97 | 0.97 | 0.98 | 0.97 | 0.97 | Less than or Equal to 0.5 | Less than or Equal to 0.5 | Commercial Product Embedded | Example 9 | Triple-Wavelength BKL | 4% | 100% |
| Comparative Example 14 | 1.45 | 0.76 | 1.10 | Transparent Substrate of Barrier Film 1 | 1.62 | | 0.96 | 0.97 | 0.96 | 0.97 | 0.96 | Less than or Equal to 0.5 | Less than or Equal to 0.5 | Commercial Product Embedded | Comparative Example 4 | Triple-Wavelength BKL | 0% | 100% |
| Comparative Example 15 | 1.45 | 0.93 | 1.35 | Transparent Substrate of Barrier Film 1 | 1.62 | | 0.96 | 0.98 | 0.96 | 0.98 | 0.96 | Less than or Equal to 0.5 | Less than or Equal to 0.5 | Commercial Product Embedded | Comparative Example 5 | Triple-Wavelength BKL | 0% | 100% |

TABLE 2-continued

| | Barrier Film | | | | | | | | | | | | Light Conversion Layer | Barrier Film | Type | LCD Performance | |
|---|---|---|---|---|---|---|---|---|---|---|---|---|---|---|---|---|---|
| | Optical Thin Film | | | Layer Adjacent to Optical Thin Film | | Wavelength Dependency of Transmittance Only of Barrier Film | | | | | Oxygen Permeability [cm³/m²/ day/atm] | Water Vapor Permeability [g/m²/day] | Containing Fluorescent Material | of Light Conversion Member | | Increment in Transmittance of Liquid Crystal Display Device (Based on Comparative Example 19) | Color Reproduction Region NTSC Ratio [%] |
| | Refractive Index n (535) | Thickness d (μm) | n (535) × d | Type | Refractive Index nu (535) | 450 nm | 493 nm | 535 nm | 583 nm | 630 nm | | | | | | | |
| Comparative Example 16 | 1.45 | 1.11 | 1.61 | Transparent Substrate of Barrier Film 1 | 1.62 | 0.96 | 0.98 | 0.96 | 0.98 | 0.96 | Less than or Equal to 0.5 | Less than or Equal to 0.5 | Commercial Product Embedded | Comparative Example 6 | Triple-Wavelength BKL | 0% | 100% |
| Comparative Example 17 | 1.45 | 1.27 | 1.84 | Transparent Substrate of Barrier Film 1 | 1.62 | 0.96 | 0.97 | 0.96 | 0.97 | 0.96 | Less than or Equal to 0.5 | Less than or Equal to 0.5 | Commercial Product Embedded | Comparative Example 7 | Triple-Wavelength BKL | 0% | 100% |
| Example 12A | 1.45 | 0.83 | 1.20 | Inorganic Film of Barrier Film 2 | 1.8 | 0.97 | 0.96 | 0.98 | 0.96 | 0.97 | Less than or Equal to 0.1 | Less than or Equal to 0.1 | Commercial Product Embedded | Example 2A | Triple-Wavelength BKL | 4% | 100% |
| Example 15A | 1.45 | 1.02 | 1.49 | Inorganic Film of Barrier Film 3 | 1.8 | 0.97 | 0.96 | 0.98 | 0.96 | 0.97 | Less than or Equal to 0.1 | Less than or Equal to 0.1 | Commercial Product Embedded | Example 5A | Triple-Wavelength BKL | 4% | 100% |
| Example 18A | 1.45 | 1.20 | 1.74 | Inorganic Film of Barrier Film 4 | 1.8 | 0.97 | 0.96 | 0.98 | 0.96 | 0.97 | Less than or Equal to 0.1 | Less than or Equal to 0.1 | Commercial Product Embedded | Example 8A | Triple-Wavelength BKL | 4% | 100% |
| Comparative Example 19 | None | None | None | Transparent Substrate of Barrier Film 1 | 1.62 | 0.96 | 0.96 | 0.96 | 0.96 | 0.96 | Less than or Equal to 0.5 | Less than or Equal to 0.5 | Commercial Product Embedded | Barrier Film 1 | Triple-Wavelength BKL | 0% | 100% |

According to Table 2 described above, it was found that the liquid crystal display device of the present invention had high light transmittance and a high color reproduction region.

In contrast, the liquid crystal display devices of Comparative Examples 14 to 17 in which the light conversion member included the optical thin film on the air interface but wavelength dependency of the transmittance of the optical thin film did not satisfy the range of the present invention had low light transmittance. It was found that the liquid crystal display device of Comparative Example 19 in which the light conversion member did not include the optical thin film on the air interface had low light transmittance.

Furthermore, a wavelength selective filter for a blue color selectively transmitting light having a wavelength of shorter than 460 nm was disposed in the backlight unit of the liquid crystal display devices of Examples 1 and 11, and similarly, excellent evaluation results were also obtained. In addition, a wavelength selective filter for a red color selectively transmitting light having a wavelength of longer than 630 nm was disposed in the backlight unit of the liquid crystal display devices of Examples 1 and 11, and similarly, excellent evaluation results were also obtained.

EXPLANATION OF REFERENCES

1: optical thin film
2: substrate
3: laminated body of optical thin film and layer directly adjacent to optical thin film
4: organic film
5: inorganic film
10: optical film (barrier film)
11: polarizing plate protective film
12: polarizer
13: polarizing plate protective film
14: backlight side polarizing plate
15: fluorescent material
16: light conversion layer containing fluorescent material
17: light conversion member
21: liquid crystal cell
31: backlight unit (R, G, B narrowband backlight unit)
32: blue light
33: green light
34: red light
41: polarizing plate protective film
42: polarizer
43: polarizing plate protective film
44: display side polarizing plate
51: liquid crystal display device

What is claimed is:

1. A liquid crystal display device, comprising:
a backlight unit including a light conversion member; and
a liquid crystal cell,
wherein the light conversion member includes a light conversion layer containing a fluorescent material and an optical film arranged on both surfaces of the light conversion layer containing the fluorescent material,
the optical film includes an optical thin film forming an air interface, and a layer directly adjacent to the optical thin film,
the optical film satisfies the following Expression (1),
the optical film satisfies any one of the following Expressions (2-1), (2-2), and (2-3),
all transmittances of the optical film at a Y value in an XYZ color system at a wavelength of 430 nm to 470 nm, a wavelength of 515 nm to 555 nm, and a wavelength of 600 nm to 650 nm are greater than transmittance of the optical film at a Y value in an XYZ color system at a wavelength of greater than 470 nm and less than 515 nm and a wavelength of greater than 555 nm and less than 600 nm,
the backlight unit emits blue light which has an emission peak wavelength in a wavelength range of 430 nm to 480 nm and has a full width at half maximum of less than or equal to 100 nm, green light which has an emission peak wavelength in a wavelength range of 500 nm to 600 nm and has a full width at half maximum of less than or equal to 100 nm, and red light which has an emission peak wavelength in a wavelength range of 600 nm to 650 nm and has a full width at half maximum of less than or equal to 100 nm, $$n(535) < nu(535) \qquad \text{Expression (1)}$$

in Expression (1), $n(535)$ represents a refractive index of the optical thin film at a wavelength of 535 nm, and $nu(535)$ represents a refractive index of the layer directly adjacent to the optical thin film at a wavelength of 535 nm, $$1.15 \ \mu m \leq n(535) \times d \leq 1.25 \ \mu m \qquad \text{Expression (2-1)}$$

$$1.42 \ \mu m \leq n(535) \times d \leq 1.52 \ \mu m \qquad \text{Expression (2-2)}$$

$$1.69 \ \mu m \leq n(535) \times d \leq 1.79 \ \mu m \qquad \text{Expression (2-3)}$$

in Expressions (2-1), (2-2), and (2-3), $n(535)$ represents a refractive index of the optical thin film at a wavelength of 535 nm, d represents a thickness of the optical thin film, and the unit is μm.

2. The liquid crystal display device according to claim 1, wherein the optical film is an optical film in which at least a first organic film, a substrate, an inorganic film, and a second organic film are laminated in this order, and
the optical thin film is the first organic film, and the substrate is the layer directly adjacent to the optical thin film.

3. The liquid crystal display device according to claim 2, wherein the inorganic film is a silicon oxide film or a silicon oxide nitride film.

4. The liquid crystal display device according to claim 1, wherein the optical thin film contains a Cardo polymer.

5. The liquid crystal display device according to claim 1, wherein the optical film of the liquid crystal display device satisfies any one of the following Expressions (2-1A), (2-2A), and (2-3A), $$1.16 \ \mu m \leq n(535) \times d \leq 1.24 \ \mu m \qquad \text{Expression (2-1A)}$$

$$1.46 \ \mu m \leq n(535) \times d \leq 1.51 \ \mu m \qquad \text{Expression (2-2A)}$$

$$1.70 \ \mu m \leq n(535) \times d \leq 1.78 \ \mu m \qquad \text{Expression (2-3A)}$$

in Expressions (2-1A), (2-2A), and (2-3A), $n(535)$ represents a refractive index of the optical thin film at a wavelength of 535 nm, d represents a thickness of the optical thin film, and the unit is μm.

6. The liquid crystal display device according to claim 5, wherein the liquid crystal display device satisfies Expression (2-2A) described above.

7. The liquid crystal display device according to claim 1, wherein all transmittances of a laminated body of the optical thin film and the layer directly adjacent to the optical thin film at a Y value in an XYZ color system at a wavelength of 430 nm to 470 nm, a wavelength of 515 nm to 555 nm, and a wavelength of 600 nm to 650 nm are greater than or equal to 97%.

8. The liquid crystal display device according to claim 1, wherein all transmittances of the laminated body of the optical thin film and the layer directly adjacent to the optical thin film at a Y value in an XYZ color system at a wavelength of greater than 470 nm and less than 515 nm and a wavelength of greater than 555 nm and less than 600 nm are less than 97%.

9. The liquid crystal display device according to claim 1, wherein the backlight unit includes a light guide plate, and the light conversion member is arranged between the light guide plate and the liquid crystal cell.

10. The liquid crystal display device according to claim 1, wherein the optical film is a barrier film, the barrier film is for the light conversion member containing the fluorescent material, and oxygen permeability of the barrier film is less than or equal to 0.5 cm$^3$/m$^2$/day/atm.

11. The liquid crystal display device according to claim 1, wherein the fluorescent material is a quantum dot.

12. An optical film for a light conversion member containing a fluorescent material, comprising:
an optical thin film forming an air interface; and
a layer directly adjacent to the optical thin film,
wherein the optical film satisfies the following Expression (1),
the optical film satisfies any one of the following Expressions (2-1), (2-2), and (2-3), all transmittances of the optical film at a Y value in an XYZ color system at a wavelength of 430 nm to 470 nm, a wavelength of 515 nm to 555 nm, and a wavelength of 600 nm to 650 nm are greater than transmittance of the optical film at a Y value in an XYZ color system at a wavelength of greater than 470 nm and less than 515 nm and a wavelength of greater than 555 nm and less than 600 nm, $n(535) < nu(535)$    Expression (1)

in Expression (1), n(535) represents a refractive index of the optical thin film at a wavelength of 535 nm, and nu(535) represents a refractive index of the layer directly adjacent to the optical thin film at a wavelength of 535 nm, 1.15 µm ≤ $n(535) \times d$ ≤ 1.25 µm    Expression (2-1)

1.42 µm ≤ $n(535) \times d$ ≤ 1.52 µm    Expression (2-2)

1.69 µm ≤ $n(535) \times d$ ≤ 1.79 µm    Expression (2-3)

in Expressions (2-1), (2-2), and (2-3), n(535) represents a refractive index of the optical thin film at a wavelength of 535 nm, d represents a thickness of the optical thin film, and the unit is µm.

13. The optical film according to claim 12, wherein the optical film is an optical film in which at least a first organic film, a substrate, an inorganic film, and a second organic film are laminated in this order, and the optical thin film is the first organic film, and the substrate is the layer directly adjacent to the optical thin film.

14. The optical film according to claim 13, wherein the inorganic film is a silicon oxide film or a silicon oxide nitride film.

15. The optical film according to claim 12, wherein the optical thin film contains a Cardo polymer.

16. The optical film according to claim 12, wherein the optical film satisfies any one of the following Expressions (2-1A), (2-2A), and (2-3A), 1.16 µm ≤ $n(535) \times d$ ≤ 1.24 µm    Expression (2-1A)

1.46 µm ≤ $n(535) \times d$ ≤ 1.51 µm    Expression (2-2A)

1.70 µm ≤ $n(535) \times d$ ≤ 1.78 µm    Expression (2-3A)

in Expressions (2-1A), (2-2A), and (2-3A), n(535) represents a refractive index of the optical thin film at a wavelength of 535 nm, d represents a thickness of the optical thin film, and the unit is µm.

17. The optical film according to claim 16, wherein the optical film satisfies Expression (2-2A) described above.

18. The optical film according to claim 12, wherein all transmittances of a laminated body of the optical thin film and the layer directly adjacent to the optical thin film at a Y value in an XYZ color system at a wavelength of 430 nm to 470 nm, a wavelength of 515 nm to 555 nm, and a wavelength of 600 nm to 650 nm are greater than or equal to 97%.

19. The optical film according to claim 12, wherein all transmittances of the laminated body of the optical thin film and the layer directly adjacent to the optical thin film at a Y value in an XYZ color system at a wavelength of greater than 470 nm and less than 515 nm and a wavelength of greater than 555 nm and less than 600 nm are less than 97%.

20. The optical film according to claim 12, wherein the fluorescent material is a quantum dot.

21. A barrier film, comprising:
the optical film according to claim 12,
wherein the barrier film is for a light conversion member containing a fluorescent material, and
oxygen permeability is less than or equal to 0.5 cm$^3$/m$^2$/day/atm.

22. A light conversion member, comprising:
a light conversion layer containing a fluorescent material; and
the optical film according to claim 12 which is each independently arranged on both surfaces of the light conversion layer containing the fluorescent material.

23. A backlight unit, comprising:
the light conversion member according to claim 22,
wherein the backlight unit emits blue light which has an emission peak wavelength in a wavelength range of 430 nm to 480 nm and has a full width at half maximum of less than or equal to 100 nm, green light which has an emission peak wavelength in a wavelength range of 500 nm to 600 nm and has a full width at half maximum of less than or equal to 100 nm, and red light which has an emission peak wavelength in a wavelength range of 600 nm to 650 nm and has a full width at half maximum of less than or equal to 100 nm.

24. The backlight unit according to claim 23, further comprising:
a light guide plate,
wherein the light conversion member is arranged on a path of light exiting from the light guide plate.

* * * * *